US008216529B2

(12) United States Patent
Ade et al.

(10) Patent No.: US 8,216,529 B2
(45) Date of Patent: Jul. 10, 2012

(54) FLUID-CONTAINING POUCHES WITH REDUCED GAS EXCHANGE AND METHODS FOR MAKING SAME

(75) Inventors: Rhonda Ade, Ottawa (CA); Steven R. Breeze, Ottawa (CA); Philippe Poirier, Orleans (CA); Bill Dickie, Ottawa (CA)

(73) Assignee: Abbott Point of Care Inc., Princeton, NJ (US)

( * ) Notice: Subject to any disclaimer, the term of this patent is extended or adjusted under 35 U.S.C. 154(b) by 667 days.

(21) Appl. No.: 12/211,095

(22) Filed: Sep. 15, 2008

(65) Prior Publication Data

US 2010/0068097 A1  Mar. 18, 2010

(51) Int. Cl.
*B01L 3/00* (2006.01)
*B67B 1/00* (2006.01)
*B29C 47/00* (2006.01)
*B32B 27/00* (2006.01)
*C04B 9/02* (2006.01)

(52) U.S. Cl. ............. 422/547; 222/153.01; 156/244.27; 428/424.2; 106/14.34

(58) Field of Classification Search .................... 53/202, 53/285, 375.8, 375.9, 376.2, 451, 558, 562; 156/73.1, 182, 350, 383, 244.27; D09/702, D09/707; 702/19; 422/547; 222/153.01; 428/424.2; 106/14.34
See application file for complete search history.

(56) References Cited

U.S. PATENT DOCUMENTS

| | | | |
|---|---|---|---|
| 2,248,471 A | * | 7/1941 | Stroop .............................. 53/412 |
| 3,651,615 A | * | 3/1972 | Bohner et al. ................... 53/452 |
| 3,679,509 A | | 7/1972 | Fielibert |
| 3,986,914 A | * | 10/1976 | Howard ......................... 156/251 |
| 4,116,336 A | * | 9/1978 | Sorensen et al. ............ 206/524.8 |
| 4,266,692 A | * | 5/1981 | Clark ............................... 222/94 |
| 4,961,302 A | | 10/1990 | Davis |
| 5,096,669 A | | 3/1992 | Lauks et al. |
| 5,112,455 A | | 5/1992 | Cozzette et al. |
| 5,200,051 A | | 4/1993 | Cozzette et al. |
| 5,399,401 A | * | 3/1995 | Powell ......................... 428/36.9 |
| 5,440,860 A | * | 8/1995 | Meli et al. ....................... 53/451 |
| 5,614,416 A | | 3/1997 | Lauks et al. |
| 5,690,215 A | * | 11/1997 | Kimball et al. ............. 206/213.1 |
| 5,789,253 A | * | 8/1998 | Lauks et al. .................... 436/68 |

(Continued)

FOREIGN PATENT DOCUMENTS

WO    03095332 A1    11/2003

(Continued)

OTHER PUBLICATIONS

International Search Report and Written Opinion for PCT/US2009/056909 mailed May 21, 2010 (18 pages).

*Primary Examiner* — Lore Jarrett

(57) ABSTRACT

The invention is directed to fluid-containing pouches and to methods for forming fluid-containing pouches. In one embodiment, the invention is to a fluid-containing pouch, comprising first and second opposing sheets, and a fluid (e.g., a calibrant fluid, a reactant fluid or a wash fluid) disposed between the first and second opposing sheets. The first sheet and the second sheet have a substantially liquid and gas impermeable perimeter seal. The sheets may be sealed, for example, by one or more of heat crimping, pressure crimping, heat and pressure crimping, ultrasonic welding, metal-to-metal welding or laser welding. Fluid-containing pouches sealed according to the disclosed methods and apparatuses show substantially improvement in terms of reduced gas exchange, notably $CO_2$ pressurization levels.

64 Claims, 15 Drawing Sheets

U.S. PATENT DOCUMENTS

| | | | |
|---|---|---|---|
| 6,030,827 A | 2/2000 | Davis et al. | |
| 6,178,832 B1 | 1/2001 | Mathur et al. | |
| 6,218,017 B1 * | 4/2001 | Yamashita et al. | 428/424.2 |
| 6,318,894 B1 * | 11/2001 | Derenthal | 383/204 |
| 6,438,498 B1 | 8/2002 | Opalsky et al. | |
| 6,750,053 B1 | 6/2004 | Opalsky et al. | |
| 7,263,501 B2 | 8/2007 | Tirinato et al. | |
| 7,419,821 B2 * | 9/2008 | Davis et al. | 435/288.5 |
| 2002/0017310 A1 * | 2/2002 | Gruenbacher et al. | 132/320 |
| 2003/0230387 A1 * | 12/2003 | Smith et al. | 156/581 |
| 2004/0040372 A1 * | 3/2004 | Plester et al. | 73/38 |
| 2004/0222091 A1 | 11/2004 | Lauks et al. | |
| 2005/0103678 A1 * | 5/2005 | Clark et al. | 206/538 |
| 2006/0013744 A1 | 1/2006 | Mikkelsen et al. | |
| 2006/0183216 A1 | 8/2006 | Handique et al. | |
| 2007/0080078 A1 * | 4/2007 | Hansen et al. | 206/219 |
| 2007/0184225 A1 * | 8/2007 | Okamoto et al. | 428/35.7 |
| 2010/0065187 A1 * | 3/2010 | Vaillant et al. | 156/73.1 |

FOREIGN PATENT DOCUMENTS

| | | |
|---|---|---|
| WO | 2006082514 A1 | 8/2006 |
| WO | 2008037505 A1 | 4/2008 |

\* cited by examiner

| Design | Description | Sealing Surface | | Dim A | | Dim B | | Dim C | | Dim D | | Improvement Factor |
|---|---|---|---|---|---|---|---|---|---|---|---|---|
| | | (in^2) | (mm^2) | in | mm | in | mm | in | mm | in | mm | |
| A | Crimp Outside position | 0.089 | 57.42 | 0.690 | 17.5 | 0.630 | 16.0 | 0.650 | 16.5 | 0.570 | 14.5 | 4.8 |
| B | Crimp Inside Position | 0.048 | 30.97 | 0.650 | 16.5 | 0.610 | 15.5 | 0.590 | 15.0 | 0.450 | 11.4 | 1.2 |
| C | Rounded Crimp Edge | N/A | N/A | 0.650 | 16.5 | 0.570 | 14.5 | 0.690 | 17.5 | 0.630 | 16.0 | No Seal |
| D | Crimp Design | 0.099 | 63.87 | 0.690 | 17.5 | 0.610 | 15.5 | 0.630 | 16.0 | 0.550 | 14.0 | No Improvement |
| E | Multilevel | 0.105 | 67.74 | 0.715 | 18.2 | 6.250 | 158.8 | 0.655 | 16.6 | 0.565 | 14.4 | 5.6 |
| F | Multilevel | 0.080 | 51.61 | 0.715 | 18.2 | 0.655 | 16.6 | 0.655 | 16.6 | 0.595 | 15.1 | No Seal |
| G | Multilevel | 0.067 | 43.23 | 0.715 | 18.2 | 0.665 | 16.9 | 0.655 | 16.6 | 0.605 | 15.4 | 0.79 |
| H | Angle Inside (15 Degrees) | 0.148 | 95.48 | 0.715 | 18.2 | 0.590 | 15.0 | 0.655 | 16.6 | 0.530 | 13.5 | 0.47 |

FIG. 21

*Outlier Test Applied to Original Data

FLUID-CONTAINING POUCHES WITH REDUCED GAS EXCHANGE AND METHODS FOR MAKING SAME

BACKGROUND OF THE INVENTION

1. Field of the Invention

The invention relates to medical diagnostic sensor packaging. More particularly, the invention relates to a system and method for sealing a one-time use medical diagnostic sensor package.

2. Background Art

In the area of blood testing on patients using various sensing technologies, it is well known that the sensors must be properly calibrated if the measurement is to be performed with the desired degree of accuracy. Recent developments in clinical diagnostics have led to the development of unitized testing systems where a sensor is packaged into a device that is used for a single panel of tests and then discarded. These devices are typically used in conjunction with a reader that is able to interact with the device. Interactions include extracting a signal from each sensor, and optionally controlling the motion of fluids within the device, e.g., positioning of the sample and a calibrant fluid with respect to the sensor. A detailed description of one such system, referred to herein as the i-STAT™ system, is found in U.S. Pat. No. 5,096,669 (the '669 patent), which is jointly owned and incorporated herein by reference.

A key feature of these sensing systems is that the devices are manufactured and shipped to customers on a regular basis. The time between the manufacture and use of the device, however, can be several months. As a result, devices are manufactured with labeling that indicates the available shelf-life under a given set of conditions, e.g., six months with refrigeration, and two weeks at room temperature, among other combinations of storage conditions.

There are several reasons why shelf life of a given sensor may be limited, including, but not limited to sensor stability and calibrant fluid stability. With respect to the calibrant fluid, it is important that the concentration of the calibrant analyte (e.g., potassium ion concentration, partial pressure of carbon dioxide, among others), does not change during storage. One solution to this problem is to store calibrant fluids in a sealed glass vessel, or ampoule. In a sealed vessel, the walls of the vessel do not permit gas or liquid exchange. However, when devices are designed for convenient use, e.g., in the bedside or point of care testing environment, it may not be practical to use a glass storage vessel. The impracticalities can relate to fragility, and issues of packaging a glass element into a test housing, e.g., a single-use test cartridge. As a result, foil pouches with plastic layers have been used to affect the seal. For example, the '669 patent discloses calibrant packs that are made with plastic-lined foil having a perimeter seal. Specifically, two portions of plastic-lined foil with plastic faces abutted are sealed together to form an enclosure containing a liquid phase and a gas phase. Here, the perimeter seal is formed by applying sufficient heat to melt the plastic and sufficient pressure to form a contiguous plastic perimeter seal. Within the enclosure (or pouch), the liquid phase comprises a calibrant fluid, e.g., a buffered aqueous mixture containing known concentrations of the analytes to be tested, including, for example, potassium, sodium, glucose, and lactate, among others. The gas phase in the pouch can be, for example, air or a desired gas composition, e.g., 5% carbon dioxide, 20% oxygen and 75% nitrogen. The gas phase, or the dissolved gases in the liquid phase, can also act as a calibrant, e.g., for blood gas sensing of the partial pressures of oxygen and carbon dioxide, $pO_2$ and $pCO_2$ respectively.

With regard to the construction of the pouch, the choice of foil, e.g., ~40 µm aluminum roll, is determined by its barrier properties, i.e., the resistance to transport gases, vapors and liquids. Foils are also preferably selected to minimize pin-holes. Various optical inspection means are well known in the art for identifying pin-hole failures. The plastic layer serves as a means for providing a seal and also protecting the fluid from direct contact with the metal foil, which can cause degradation of one or more of the calibrant fluid components.

While the foil is generally an effective barrier, various gases, e.g., oxygen, carbon dioxide and water vapor are soluble in plastics to different degrees and also can permeate the plastic matrix at a given rate. This rate will be a function of temperature and pressure, the chemical composition of the plastic, the solvent from which it is cast, and the density of the cast material.

Where a specific gas is used for calibration purposes, e.g., a known partial pressure of carbon dioxide ($pCO_2$) to calibrate a $pCO_2$ sensor, it is preferable for the seal to have a low permeability and solubility for $pCO_2$. The dimension of the housing into which the fluid-containing pouch is to be packaged, however, may place restrictions on the seal dimensions.

Packaging of a pouch into a small plastic housing is shown in the '669 patent. Here the pouch sits in a plastic base with a barb structure capable of piercing the pouch. The pouch is held in place by double-sided adhesive tape attached to a plastic cover. The plastic cover has a flexible paddle directly above and aligned with the pouch. When a force is applied to the paddle, it presses the pouch against the barb, rupturing the pouch and releasing the calibrant fluid to flow through a conduit and into contact with an arrays of sensors.

A further consideration, where possible, is to minimize gas exchange across the seal by minimizing the driving force, i.e., the difference in pressure and concentration of the analyte on either side of the seal. A reduced temperature can also reduce gas exchange, however this approach must be used judiciously, as freezing an aqueous fluid within a pouch may lead to undesirable effects such as seal rupture. As a consequence, refrigeration is a useful compromise.

Regarding other art, U.S. Pat. No. 6,178,832 (hereinafter the '832 patent) describes a self-contained reagent chamber with fluids including tonometered calibrants where the chamber wall includes multiple layers of materials and where at least one layer is a thin, flexible glass material. The walls are extended to form a filler neck sealed by heat and pressure along a sealing line below a filler line, so that no bubbles are trapped in the reagent chamber.

U.S. Published Patent Application No. 20060013744 discloses a flexible container for a reference gas, for use in performing calibration or quality control of an apparatus for determining a gas parameter in a physiological liquid, such as blood. The flexible container is adapted to hold the reference gas at or close to ambient pressure.

U.S. Published Patent Application No. 20060183216 discloses a container for a liquid reagent, wherein the container has an outer wall and an internal piercing member. Such a container is configured to store the liquid for periods between 6 to 18 months with minimal loss of the liquid inside, other than if the container is ruptured. The container is preferably adapted for use with a micro-fluidic device.

U.S. Published Patent Application No. 20040222091 discloses a diagnostic device incorporating electrode modules and fluidics for performing chemical analyses. The device consists of a plastic card-like body with fluidic conduits and a sealed fluid reservoir contained in a foil-lined cavity. The reservoir holds a calibrant fluid that is used to calibrate the electrodes.

Conventional fluid-containing pouches of the type described in the '669 patent have proved commercially successful for calibrating blood testing sensors where the pouches have an extended shelf-life with refrigeration. However, the need exists for improved fluid-containing pouches that have an extended shelf-life without refrigeration, such that their contents remain substantially unaltered with extended room temperature storage.

SUMMARY OF THE INVENTION

It is therefore a general aspect of the invention to provide a fluid-containing pouch that will obviate or minimize problems of the type previously described. In various embodiments, the invention is to fluid-containing pouches having seals with low permeability and solubility for gases, e.g., $CO_2$ gas. The reduced permeability and solubility may be achieved, for example, by employing improved pouch seals that are formed from seal materials having low permeability and solubility for gases, e.g., $CO_2$ gas. In some embodiments, the seal dimensions provide a long and tortuous path length with minimal cross-section, i.e., where the ratio of cross-sectional area to path length height is small. The invention is also directed to various processes for forming such fluid-containing pouches.

In one embodiment, the invention is directed to a fluid-containing pouch, comprising first and second opposing sheets, and a fluid disposed between the first and second opposing sheets, wherein the first sheet and the second sheet have a substantially liquid and gas impermeable perimeter seal, at least a portion of which has a seal width less than about 4 mm, and wherein the pouch yields a Pouch Integrity Test $\Delta pCO_2$ value, as defined herein, of less than about 10 mm Hg. In addition to having a substantially liquid and gas impermeable seal, the fluid-containing pouch preferably has a burst strength standard deviation of less than 12%. Such pouches are particularly well-suited for use in a single-use cartridge containing at least one sensor, wherein the cartridge is used in conjunction with a reader to measure an analyte is a sample, e.g., a blood sample.

The first sheet and the second sheet optionally are folded in an undulating pattern having a plurality of bends. In a preferred aspect, the first sheet includes a first foil layer and a first plastic layer, and the second sheet includes a second foil layer and a second plastic layer. Optionally, the pouch further comprises an interior plastic seal bead disposed at an interior edge of the perimeter seal.

In one aspect, the first sheet includes a first foil layer and a first plastic layer, and the second sheet includes a second foil layer and a second plastic layer, and the perimeter seal comprises a third plastic layer disposed between the first and second foils and having an average thickness less than the combined thickness of the first and second plastic layers. The third plastic layer, for example, optionally has an average thickness that is at least about 25% less than, e.g., at least about 50% less than, the combined thickness of the first and second plastic layers. In preferred embodiments, the first and second plastic layers comprise plastic selected from the group consisting of Primacor, polyvinyl chloride, polyethylene and lacquer based on nitrocellulose, urea and acrylic resins. In one embodiment, the first sheet includes a first foil layer and a first lacquer layer, the second sheet includes a second foil layer and a second lacquer layer, and the first and second foil layers are fused to one another at the perimeter seal.

The perimeter seal preferably is formed by applying pressure in the range of from about 34.5 $MN/m^2$ to about 62.1 $MN/m^2$ and/or by applying heat in the range of from about 200° C. to about 500° C. The perimeter seal optionally has a perimeter width of from about 1 mm to about 2 cm and optionally has a perimeter length of from about 1 cm to about 20 cm.

The fluid contained in the pouch may vary, but preferably is a calibrant fluid containing a known concentration of one or more analytes, is a reactant fluid or is a wash fluid. The pouch preferably has a pouch volume of from about 5 µL to about 5 mL. The liquid volume in the pouch preferably is from about 50% to about 95%, based on the total pouch volume, and the gas volume preferably is from about 5% to about 50%, based on the total pouch volume. The gas in the gas phase preferably comprises a calibrant gas having a known concentration or partial pressure of one or more gases. The gas in the gas phase optionally is ambient air.

In a preferred embodiment, the perimeter seal includes one or more crimped regions. The one or more crimped regions preferably comprise multiple concentric crimping rings.

In another embodiment, the invention is to a fluid-containing pouch, comprising first and second opposing sheets, and a fluid disposed between the first and second opposing sheets, wherein the pouch has a burst strength with a standard deviation of less than 12%.

In another embodiment, the invention is directed to a method for forming a fluid-containing pouch, comprising the steps of: (a) depositing a fluid on a first sheet; (b) positioning a second sheet opposite the first sheet; and (c) sealing the opposing first and second sheets to one another and forming a sealed region having the fluid contained therebetween, wherein the sealed region is substantially liquid and gas impermeable. Preferably, the pouch yields a Pouch Integrity Test $\Delta pCO_2$ value, as defined herein, of less than 10 mm Hg. The process preferably further comprises forming a cavity in the first sheet, and depositing the fluid in the cavity The sealing preferably comprises applying heat and/or pressure to the first sheet and second sheets. In another aspect, the sealing comprises ultra-sonic welding or laser welding. Optionally, the first sheet and the second sheet are folded in a undulating pattern having a plurality of bends. In a particularly preferred aspect, the first sheet includes a first foil layer and a first plastic layer, and the second sheet includes a second foil layer and a second plastic layer, and the step of sealing comprises melting the first plastic layer on the first sheet with the second plastic layer on the second sheet such that an interior plastic seal bead is formed. The interior plastic seal bead substantially prevents the calibrant liquid from contacting either of or both of the first and second foil layers.

In another embodiment, the invention is to a substantially gas-tight seal formed with plastic-lined foil, comprising two portions of plastic-lined foil with the plastic faces abutted where adjacent portions are sealed together to isolate a first phase from a second phase. The seal is formed by applying sufficient heat and pressure to melt the plastic and form a plastic seal, whereby the heat and pressure are applied by a crimping element yielding one or more regions of the seal where the average thickness of plastic in the crimped region is less than the initial combined thickness of the two plastic linings, and whereby gas transport between said first phase and said second phase through said plastic seal is substantially less than a seal where plastic is not crimped during sealing. Preferably, the method is performed with the foil on a reel. The pressure optionally is applied with a jig that crimps the foil. The heat and pressure optionally are applied with ultrasonic welding.

In another embodiment, the invention is to a substantially gas-tight plastic-lined foil pouch with a perimeter seal, comprising two portions of plastic-lined foil with the plastic faces abutted and sealed together to form an enclosure containing a liquid phase and a gas phase. The perimeter seal is formed by applying sufficient heat and pressure to melt the plastic and form a plastic perimeter layer, where the pressure is applied by a crimping element yielding one or more regions of the perimeter seal where the average thickness of plastic in the perimeter seal in the crimped regions is substantially less than the initial combined thickness of the two plastic linings.

In another embodiment, the invention is to a method of forming a substantially gas tight seal in a plastic-lined foil pouch, comprising: (a) forming a pocket in a first plastic-lined foil, and applying a portion of liquid into the pocket; (b) covering the pocket with a second plastic-lined foil with the plastic faces abutted; (c) sealing the first and second plastic-lined foils together to form a perimeter seal, where said perimeter seal is formed by applying sufficient heat and pressure to melt the plastic and form a plastic perimeter layer. In this embodiment, the pressure is applied by a crimping element yielding one or more regions of the perimeter seal where the average thickness of plastic in the crimped regions is substantially less than the combined thickness of the two plastic linings, said seal forming a substantially gas tight pouch containing a liquid phase and a gas phase.

In another embodiment, the invention is a method of forming a substantially gas-tight plastic-lined foil pouch with a perimeter seal, comprising: (a) a first step where two portions of plastic-lined foil with the plastic faces abutted are sealed together to form an enclosure with a perimeter seal containing a liquid phase and a gas phase. The perimeter seal is formed by applying sufficient heat to melt the plastic and sufficient pressure to form a contiguous plastic perimeter seal. The method includes (b) a second step where said perimeter seal is crimped to yield one or more regions of the perimeter seal where the average thickness of plastic in the crimped regions is substantially less than the combined thickness of the two plastic linings.

In another embodiment, the invention is to a substantially gas-tight seal formed with plastic-lined foil, comprising: two portions of plastic-lined foil with the plastic faces abutted where adjacent portions are sealed together to isolate a first phase from a second phase, where the seal is formed by applying sufficient ultrasonic welding to melt the plastic and form a plastic seal. The ultrasonic welding yields one or more regions of the plastic seal where the average thickness of plastic in the seal region is substantially less than the initial combined thickness of the two plastic linings, and whereby gas transport between said first phase and said second phase through said plastic seal is substantially less than a seal where the thickness of plastic is substantially that of the combined thickness of two plastic linings.

In another embodiment, the invention is to a substantially gas-tight plastic-lined foil pouch with a perimeter seal, comprising two portions of plastic-lined foil with the plastic faces abutted and sealed together to form an enclosure containing a liquid phase and a gas phase, where said perimeter seal is formed by applying an ultrasonic weld to melt the plastic and form a contiguous plastic perimeter layer, and force a portion of plastic from the seal region into at least a portion of the perimeter of the enclosure, whereby the average thickness of plastic in the perimeter seal is less than the initial combined thickness of the two plastic linings.

In another embodiment, the invention is to a method of forming a substantially gas tight seal in a plastic-lined foil pouch comprising: (a) forming a pocket in a first plastic-lined foil; (b) applying a portion of liquid into the pocket; (c) covering the pocket with a second plastic-lined foil with the plastic faces abutted, (d) sealing the first and second plastic-lined foils together to form a perimeter seal, where said perimeter seal is formed by applying an ultrasonic weld to melt the plastic and force a portion of plastic from the seal region into the pocket. The seal forms a substantially gas tight pocket containing a liquid phase and a gas phase, whereby the average thickness of plastic in the perimeter seal is substantially less than the combined thickness of the two plastic linings.

In another embodiment, the invention is to a substantially gas-tight seal formed with plastic-lined foil, comprising two portions of plastic-lined foil with the plastic faces abutted where adjacent portions are sealed together to isolate a first phase from a second phase. The seal is formed by applying sufficient welding energy to substantially remove plastic from the seal region and melt the foil and form a metal-to-metal seal in said seal region. The welding energy preferably is provided by ultrasonic energy or laser energy.

In another embodiment, the invention is to a substantially gas-tight foil pouch with an inner plastic perimeter seal and an outer metal-to-metal seal, comprising: two portions of foil with a plastic lining on predetermined regions of the foil where the regions and plastic faces are aligned, abutted and sealed together to form an enclosure, bounded by an inner plastic perimeter seal, containing a liquid phase and a gas phase, and where a surrounding portion of the two portions of the foil are laser welded together forming an outer metal-to-metal seal.

In another embodiment, the invention is to a substantially gas-tight pouch, comprising an inner sealed plastic enclosure containing a liquid phase and a gas phase, and an outer sealed foil enclosure where two portions of foil are laser welded together to form an outer metal-to-metal seal enclosing said plastic enclosure.

BRIEF DESCRIPTION OF THE DRAWINGS

The novel features and advantages of the present invention will be better understood by reference to the detailed description of the preferred embodiments that follows when read in conjunction with the accompanying drawings.

FIG. 7A illustrates several variable dimensions in a manufacturing process of the fluid-containing pouches according to an exemplary embodiment of the present invention.

FIG. 21 tabulates several parameters and improvement factors of several seal designs according to various embodiments of the present invention.

DETAILED DESCRIPTION OF THE PREFERRED EMBODIMENTS

Figure 1:
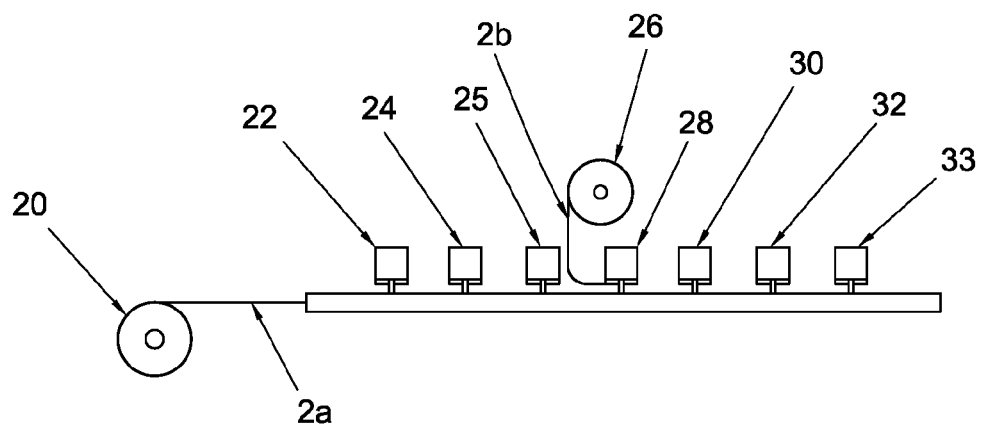
FIG. 1 illustrates a schematic design for an automated form, fill, and seal process to fill and seal fluid-containing pouches.

The various features of the preferred embodiments will now be described with reference to the drawing figures, in which like parts are identified with the same reference characters.

Introduction

The present invention will be described in terms of embodiments useful for the i-STAT blood testing system. However, as those of ordinary skill in the art will recognize, the present invention has broad applicability to other similar systems, used both in the clinical and non-clinical environments, including, but not limited to, water quality testing. Extensive description of the i-STAT system is found in the following jointly owned patents, the entireties of which are incorporated herein by reference: U.S. Pat. Nos. 5,096,669; 5,112,455; 5,200,051; 5,614,416; 6,030,827; 6,438,498; 6,750,053; and 7,263,501.

The i-STAT system comprises a hand-held reader which operates with a range of single-use disposable cartridges. Each cartridge has a silicon chip with a set of electrochemical sensors that can be used to determine the concentration of various analytes such as, for example, sodium, potassium, glucose, creatinine, pH, oxygen, carbon dioxide, troponin I, B-natriuretic peptide and the like.

Each i-STAT cartridge also has a hermetically sealed foil pouch containing a fluid that is used during the analysis process, e.g., assay process, to provide for calibration, to react with the sample, or as a wash fluid. Where the fluid is used for calibration, in the first step the pouch is ruptured by means of a force generated by the reader. The fluid then flows through a conduit and into contact with the sensors. The sensors, which are in electrical contact with the reader, generate a calibrant signal that is recorded by the reader. In the second step a blood sample is forced through the conduit displacing the calibrant fluid, and signals from the sensors in contact with the blood sample are recorded. Based on the known concentration of the analyte in the calibrant fluid, the reader can calculate the unknown concentration of the analyte in the blood by means of an algorithm that uses the two signals.

Fluid-containing pouches manufactured according to an exemplary embodiment offer the advantage of simplifying shipping and storage of product for hospitals and other users. According to an exemplary embodiment, advanced pouch sealing techniques are employed during formation of the pouches. In a preferred embodiment, opposing sheets of material, e.g., foil, are sealed to one another so as to fuse them together and form a substantially liquid and gas impermeable interface at the perimeter thereof. Examples of suitable sealing processes include heat crimping, pressure crimping, heat and pressure crimping, ultrasonic welding, metal-to-metal welding and laser welding, among other pouch sealing techniques.

Those skilled in the art will recognize that the integrity of the resulting pouch is directly dependent on the integrity of the fluid, e.g., calibrant fluid. This means that the fluid must remain substantially unchanged between the time it is manufactured and sealed in the pouch, and when it is used, for example in an assay. This time difference many be many months. As a result, the sealing of the pouch is crucial to its integrity.

Conventional Fluid-Containing Pouch Forming and Sealing

Figure 2:
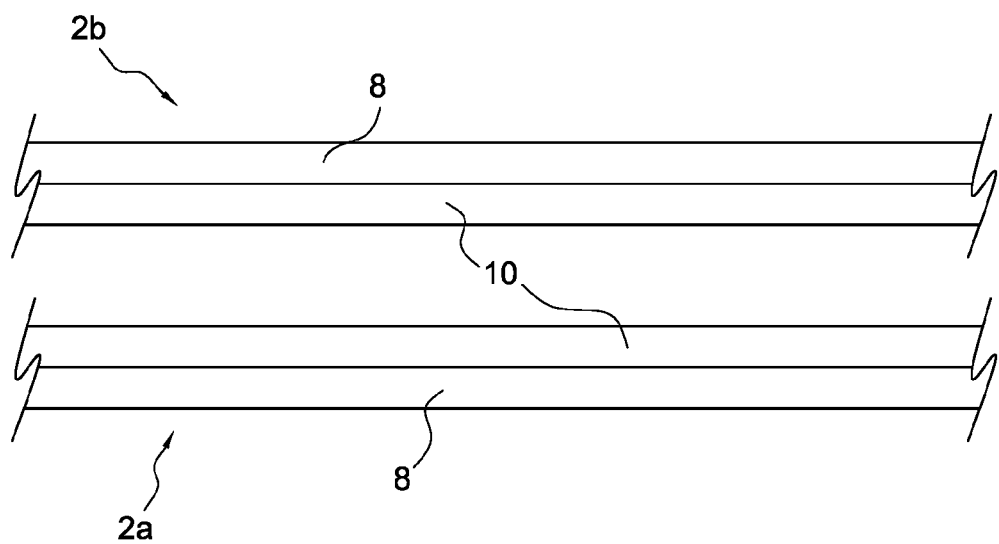
FIG. 2 illustrates a cross sectional view of two pieces of sealing foil as they enter the automated fluid-containing pouch sealing system shown in FIG. 1.
Figure 3:
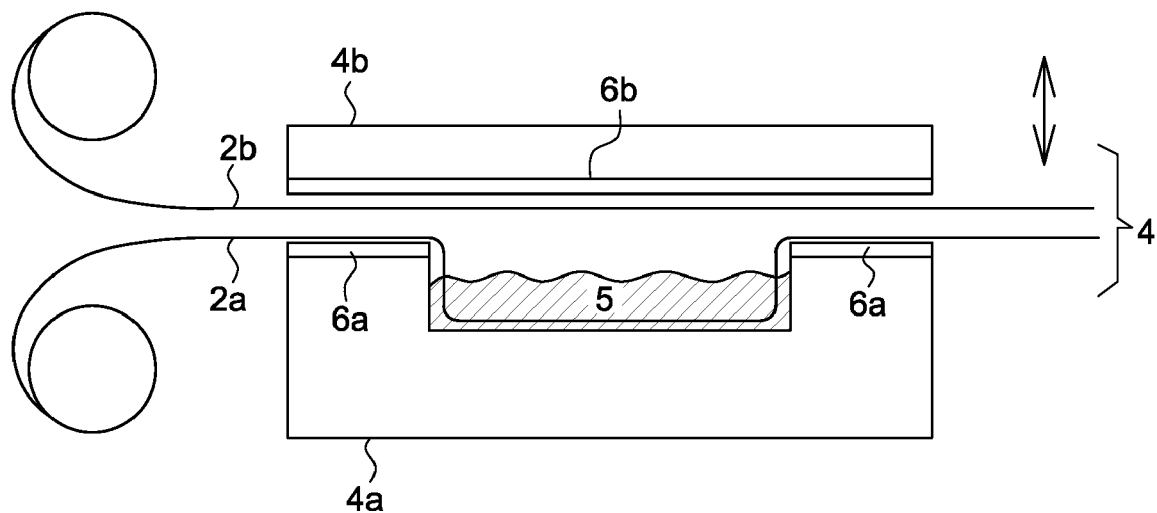
FIG. 3 illustrates a conventional fluid-containing pouch sealing jig.
Figure 4:
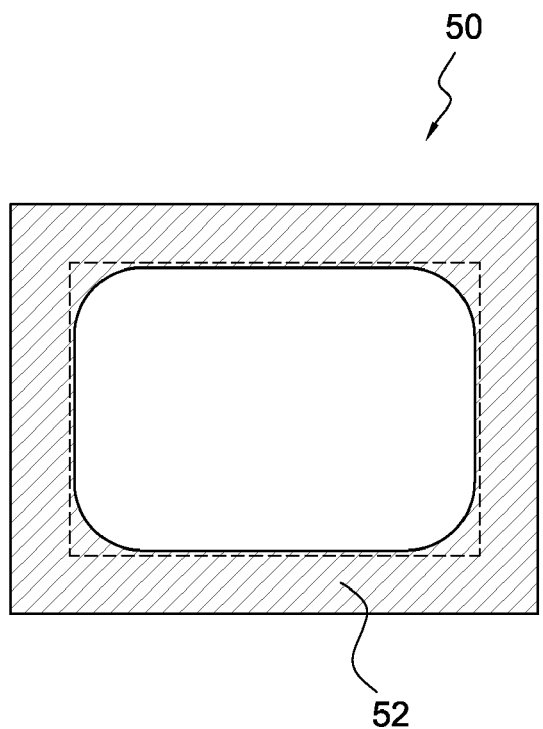
FIG. 4 illustrates a top view of a conventionally sealed fluid-containing pouch, showing areas of sealing.
Figure 7A:
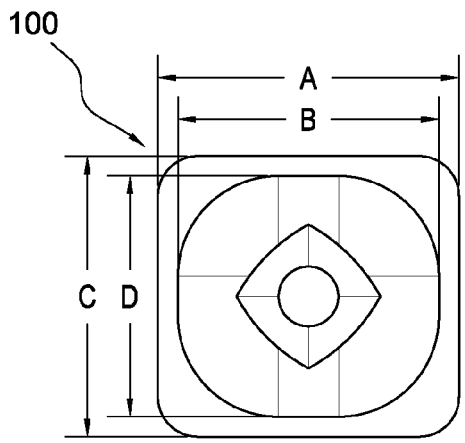
FIGS. 7A-7C and 7E illustrate a top view, a first perspective view, a side view, and a second perspective view, respectively, of a fluid-containing pouch manufactured using the system as shown in FIG. 1 according to an exemplary embodiment of the present invention.
Figure 7B:
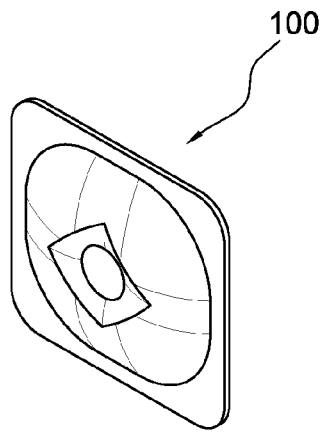
Figure 7C:
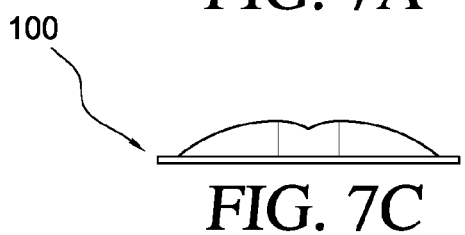
Figure 7D:
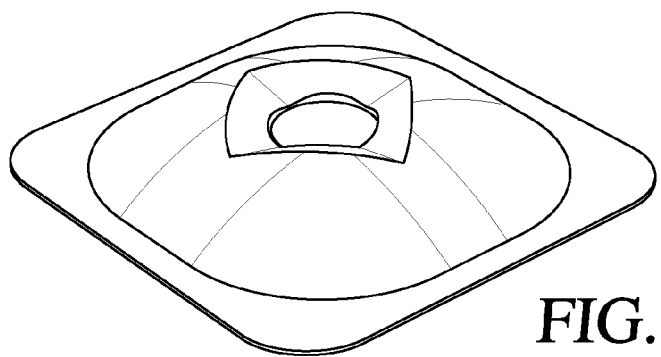
FIG. 7D illustrates a conventionally sealed fluid-containing pouch.

As shown in FIG. 2, each sealing foil 2a, 2b comprises a plastic lined side 10, and a foil side 8. According to a conventional method, illustrated in FIG. 3, jig 4 comprises a lower portion 4a, which is generally concave in shape, and an upper portion 4b, which is flat. In this context, the term "concave" is employed generally to refer to a recessed portion, which might not be concave in shape. Either or both lower portion 4a and/or upper portion 4b includes a heating element, 6a, 6b, respectively. A piece of sealing foil 2a is formed in a concave manner by lower portion 4a of jig 4, with plastic lined side 10 of foil 2a facing away from lower concave portion 4a. Forming of the foil into a concave shape may be by pneumatic means, or with a vacuum chuck, or by use of a press with a concave shape. The foil 2a disposed in the concave region of lower portion 4a is then partially filled with the desired fluid 5 (as shown in FIG. 3), e.g., calibrant fluid, and second sealing foil 2b is placed over the top of foil 2a with the plastic lined side of sealing foil 2b abutting the plastic lined side of sealing foil 2a (as shown in FIGS. 2 and 3). Upper portion 4b of jig 4 is then applied to the two pieces of sealing foil 2a, 2b to effect the seal, and heat and pressure are applied to the perimeter regions of sealing foil 2a, 2b through heating elements 6a, 6b. As a result, the two separate plastic layers 10a, 10b of foils 2a, 2b, respectively, melt together to form a single plastic layer fusing foil 2a and foil 2b to one another. The process effectively proceeds stepwise as follows: (a) forming a pocket in a first plastic-lined foil, (b) depositing a liquid into the pocket, (c) covering the pocket with a second plastic-lined foil with the plastic faces abutting one another, and (d) sealing the first and second plastic-lined foils together to form a perimeter seal, where the perimeter seal is formed by applying sufficient heat and/or pressure to effect the perimeter seal. FIG. 4 illustrates a top view of a conventionally sealed fluid-containing pouch 50, showing perimeter sealing area 52 (hash marks). FIG. 7D illustrates a perspective view of a similar pouch 50.

Figure 5:
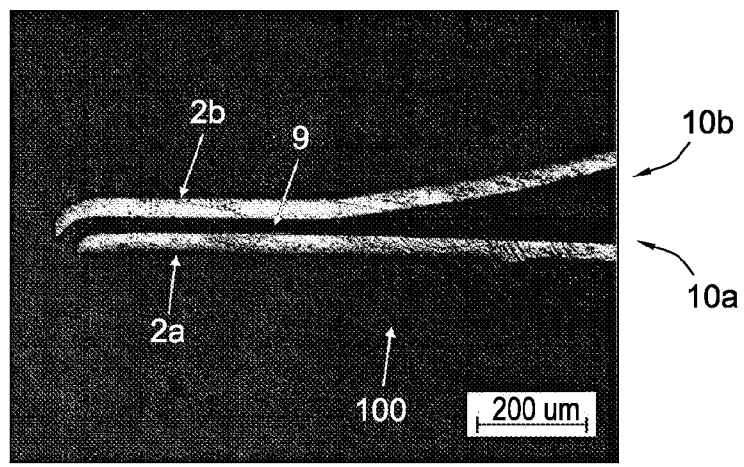
FIG. 5 illustrates a micrograph of a cross-section of a seal region of a fluid-containing pouch after sealing as described in U.S. Pat. No. 5,096,669.

FIG. 5 illustrates a micrograph of a cross-section of a seal region of fluid-containing pouch 100 after sealing with conventional jig 4, described above. As shown, upper layer foil 2b is in close proximity to lower foil layer 2b, and upper and lower plastic layers 10b, 10a, respectively, have melted into each other to form a single continuous plastic layer 9. The micrograph shows that the plastic seal layer (comprised of upper and lower plastic layers 10b, 10a, of upper foil layer 2b and lower foil layer 2a, respectively) has a substantially uniform thickness across the region where the seal will occur. As described above, the fluid-containing pouches of the invention have seals that better inhibit gas exchange from within the pouch to the ambient air external to the pouch.

Improved Fluid-Containing Pouches

In some embodiments, the invention is directed to improved fluid-containing pouches having seals that are substantially liquid and gas impermeable. For purposes of the present specification and claims, a seal is "substantially liquid and gas impermeable" if it yields a $\Delta pCO_2$ value from a Pouch Integrity Test, as defined below, of less than 30 mm Hg, preferably less than 20 mm Hg, or less than 10 mm Hg. Pouches that yield $\Delta pCO_2$ values less than 10 mm Hg are highly desirable as they provide for improved pouch shelf life over conventional pouches, particularly at room temperature. In other aspects, the invention is to various processes for forming fluid-containing pouches.

The pouches may be formed, for example, by crimping (e.g., with heat and/or pressure), ultrasonic welding, laser welding, and/or folding a material in a regular undulation comprising one or more bends such that the material will retain the shape intended. In a preferred embodiment, the fluid-containing pouch is sealed by a crimping process in which heat and pressure are applied to seal opposing foils to one another and form a substantially liquid and gas impermeable seal. Preferably, the heat is sufficient to melt the plastic and the pressure is sufficient to force a portion of the melted plastic from the seal region into the pocket, resulting in a structure where the average thickness of plastic in the perimeter seal is less than the initial combined thickness of the two plastic linings, preferably at least 25% less, e.g., at least 50% less, at least 75% less, at least 90% less or at least 95% less than the combined thickness of the two plastic linings prior to heating.

Figure 6A:
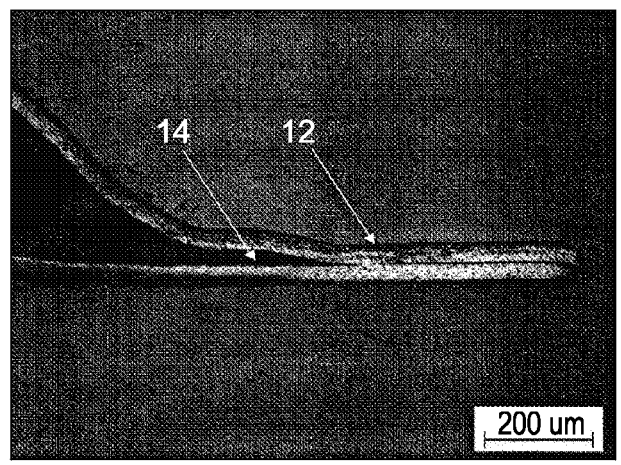
FIGS. 6A-6B illustrate cross-section micrographs of seal regions for two fluid-containing pouches following sealing according to exemplary embodiments of the present invention.
Figure 6B:
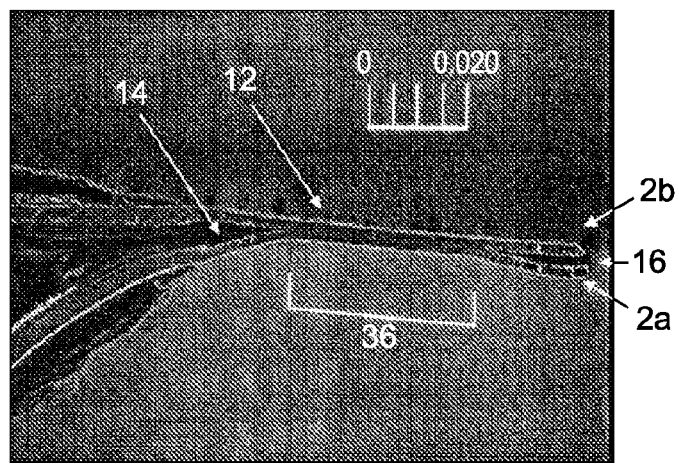

FIGS. 6A and 6B illustrate cross-sectional micrographs of seal regions according to two exemplary embodiments of the invention. These micrographs were made by cutting through the pouch and mounting it in a resin block and polishing the surface so that an image of the seal can be recorded. Specifically, the resin, e.g., Crystalbond, is heated (~250° C.) and placed with the component into a mold. After cooling, the resin preferably is polished, e.g., first with 800 Grit paper, progressively finer abrasives and then finally with 3 μm diamond polish until an optically satisfactory surface is produced. It has been found that dark field images give better detail and this method is used for the images shown.

As shown in the embodiment of FIG. 6A, lower sealing foil 2a has been sealed with upper sealing foil 2b using crimping jig 18 (see FIG. 8) to form reduced plastic sealing region 12 (reduced in thickness), and forming interior plastic seal bead 14, the net effect of which, as discussed in greater detail below, provides a substantially liquid and gas impermeable seal. In the embodiment of FIG. 6B, lower sealing foil 2a has been sealed with upper sealing foil 2b using crimping jig 18 (see FIG. 8) to form reduced plastic sealing region 12 (reduced in thickness), and forming interior plastic seal bead 14 as well as an exterior plastic seal bead 16, to provide a substantially liquid and gas impermeable seal. The embodiment of FIG. 6A may be formed from the embodiment of FIG. 6B, for example, by trimming the pouch (optionally in punch station 32, described below with reference to FIG. 1) in the region of the reduced plastic sealing region so as to remove outer bead 16.

FIG. 1 is a schematic design for an automated form, fill, and seal process and system (pouch sealing system 150) to fill and seal fluid-containing pouches according to one embodiment of the invention. According to a preferred embodiment, sealing foils 2a, 2b includes aluminum foil 8 with a nominal thickness ranging from about 0.01 to about 2.0 mm, and preferably about 0.02 to about 0.05 mm, and in the preferred embodiment about 0.0015 inches (0.038 mm). The foil also preferably includes a plastic layer 10 formed thereon and having a nominal thickness of from about 0.005 to about 0.5 mm, and preferably from about 0.01 to about 0.05 mm, and in the preferred embodiment about 0.0008 inches (0.020 mm).

The specific plastic material employed in the plastic layer may vary widely. In some exemplary embodiments, the plastic is selected from polyvinyl chloride (PVC), polyethylene and polypropylene, e.g., Dow Corning™ Primacor™ plastic liner. During manufacture, plastic layer 10 preferably is extruded onto an aluminum foil roll 8. Those of ordinary skill in the art will recognize that other lined foils can also be used, including, for example, aluminum coated with PVC or aluminum coated with polyethylene. In addition to the use of aluminum for the foil layer, copper or brass foils or other metal foils may be used.

As shown in FIG. 1, sealing system 150 comprises several components including forming foil unwind station 20, active/passive index station (index station) 22, forming station 24, fluid dispensing station 25, lid foil unwind station 26, seal station 28, dimple station 30, punch station 32, and rear indexing station 33. Forming foil unwind station 20, which retains and dispenses lower sealing foil 2a, includes adjustments for various material reel widths, including guide rollers, driven rollers, and counter rubber rollers. Index station 22, which allows for movement of sealing foil 2a, includes a pneumatic driver on a slide table with a mechanical stop for the active index, and a spring-return passive index to keep constant tension on sealing foil 2a. Index station 22 is adjustable for both the active and passive indexes. Forming station 24 pneumatically cold-forms the foil by application of high-pressure air over a shaped form (e.g., concave crimping jig 18a, shown in FIG. 8) or by mechanical deformation. Either method forms the pocket into which fluid is dispensed in fluid dispensing station 25. The fluid dispense station 25 includes a pump and controller mountings. According to various embodiments, from about 0.01 to about 2.0 mL of fluid may be used. In a preferred embodiment about 0.1 to about 0.3 mL is used, preferably about 0.16 mL of fluid, e.g., calibrant fluid, reactant fluid or wash fluid, is dispensed into each pocket.

The lid foil unwind station 26 provides upper sealing foil 2b, and includes adjustments for various material reel widths and guide rollers. Following lid foil unwind station 26 is seal station 28. The seal component of seal station 28, which forms part of crimping jig 18, includes a chilled top plate and a heated upper sealing plate (flat crimping jig 18b, shown in FIG. 8) and temperature controller. According to exemplary embodiments, the seal temperature depends on the melting point of the plastic that is being used and is typically in the ranges from about 200° C. to about 500° C., e.g., from about 200° C. to about 450° C. These values are readily obtained from the plastics literature. In the preferred embodiment using Primacor, it is preferable to use a sealing temperature of about 300 to 400° C. and for actual production of pouches the temperature was set at 360° C.±5° C. The seal force is preferably initially about 900 Newtons±50 N, increasing to a maximum force of about 6,700 Newtons±230 N during the sealing cycle. Optionally, the perimeter seal is formed by applying pressure in the range of from about 5,000 lb/inch$^2$ (34.5 MN/m$^2$) to about 9,000 lb/inch$^2$ (62.1 MN/m$^2$), and optionally about 6,666 lb/inch$^2$ (46.0 MN/m$^2$).

Those skilled in the art will recognize that the area of the seal will affect the desired applied force to obtain a reliable seal. This may be ascertained without undue experimentation using the methods described herein. Fluid dispensing station 28 also preferably includes a load cell for monitoring the sealing force.

Figure 7E:
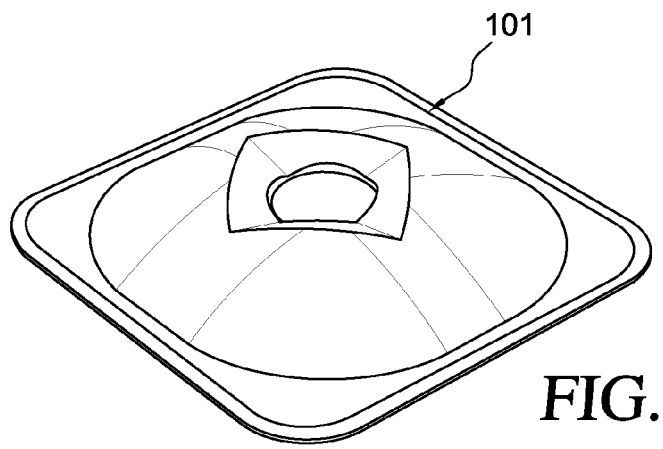

The next component of exemplary sealing system 150 is dimple station 30. Dimple station 30 mechanically deforms one side of the sealed foil pouch creating an indentation. The indentation preferably is in the center of the pocket of fluid-containing pouch 100 as shown in FIGS. 7A and 7B. FIGS. 7A-7C illustrate a top view, perspective view, and side view respectively of fluid-containing pouch 100 manufactured using sealing system 150. FIG. 7E provides an additional perspective view showing crimped edge 101. (For comparison, FIG. 7D illustrates a conventionally sealed fluid-containing pouch lacking crimped edge 101.) A laser, not shown in FIG. 1, can be used to measure dimensions of the indentation. In the i-STAT cartridge, the purpose of the indentation is to avoid premature contact of the puncturing element with the foil pouch.

Exemplary sealing system 150 also includes punch or cut station 32, which acts to cut out fluid-containing pouches 100 from the foil reels. Punch station 32 may include, for example, a table, guide posts, dial indicator, and adjustment screws. Furthermore, punch station 32 may include delivery chutes that can discharge punched-out fluid-containing pouches 100 to a discharge conveyer at a rate, for example, ranging from about 10 to about 100 cycles per minute, and typically about 30 cycles per minute. Note that where the width of the foil can accommodate more than one pouch, the production rate will double, triple, etc. In the preferred sealing system 150, the width of the foil accommodates three adjacent pouches. Following punch station 32 is rear indexing station 33, which may operate in a manner similar to indexing station 22.

According to a preferred embodiment, as shown in FIG. 1, two individual portions of plastic-lined sealing foil 2a, 2b are used to make fluid-containing pouch 100 (i.e., two separate rolls of sealing foil 2 are brought together and fused to one another). In another embodiment, a single piece of sealing foil 2 is used to manufacture fluid-containing pouches 100. According to this alternative embodiment, a single piece of sealing foil, for example, may be folded and opposite edges sealed to form fluid-containing pouch 100.

One or more steps prior to the sealing step, e.g., the liquid application and sealing steps, may be performed in a controlled atmosphere in order to control the resulting gas phase composition contained in the pouch. For example, a glove box may be employed for this purpose. Additionally or alternatively, the chemical composition of the liquid phase may be selected to substantially determine the gas phase composition after sealing. Where possible, the latter is preferred as it simplifies the overall manufacturing process. For example, a bicarbonate salt can be added to the fluid and stored in a sealed dispensing container without a head space. The combined fluid and bicarbonate salt can then be dispensed into the pocket and quickly sealed. As the bicarbonate subsequently equilibrates with the air in the small head space in the pouch, it will determine the partial pressure of carbon dioxide in the fluid and head space. The equilibration of bicarbonate is well known and follows the reaction sequence:

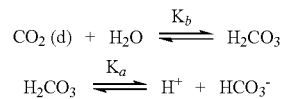

The above-described pouch formation process can be performed in a substantially manual format where the foil-forming jig is separate from the sealing jig, and the filling step is done by manual pipetting. However, it is preferred that the process is automated, as shown in FIG. 1, which depicts an automated fluid-containing pouch reel-based sealing system 150, wherein rolls of foil 2a, 2b, are continuously fed into the form, filled and sealed. Automation enables the time between the fluid dispensing step and the sealing step to be both short (e.g., between about 1 second to about 10 seconds) and controlled from pouch to pouch.

Figure 8:
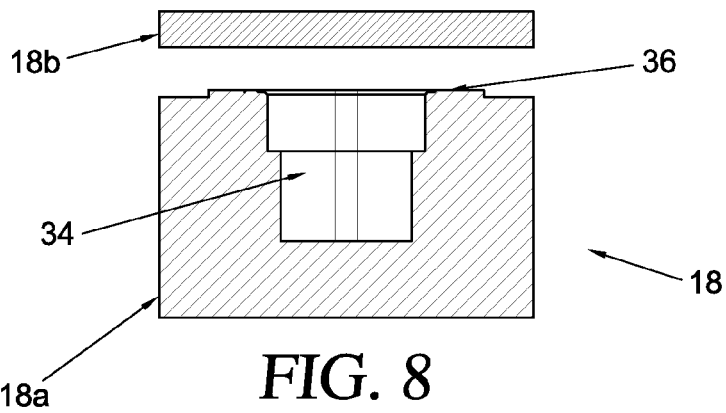
FIG. 8 illustrates a cross-sectional view of a sealing jig according to an exemplary embodiment of the present invention.
Figure 9:
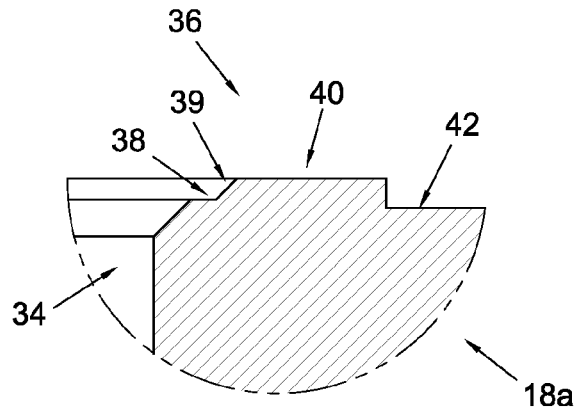
FIG. 9 illustrates a close-up cross sectional view of a crimping region of the crimping jig as shown in FIG. 8.

FIG. 8 illustrates a cross-sectional view of crimping jig 18 according to an exemplary embodiment used in fluid dispense and sealing station 28, and FIG. 9 illustrates a close-up cross sectional view of the crimping region of crimping jig 18 as shown in FIG. 8. Crimping jig 18 includes lower concave crimping jig 18a and flat crimping jig 18b. As shown, crimping jig orifice 34 accepts lower sealing foil 2a, optionally with the application of a vacuum, as it is passed over lower concave crimping jig 18a from forming foil unwind station 20, index station 22, and forming station 24. An outside perimeter edge of lower sealing foil 2a sits on crimping region 36. Crimping region 36, which is shown in greater detail in FIG. 9, includes interior crimp region edge 38, flat crimp region 40, and exterior crimp region edge 42. As shown, an inward angled edge 39 separates interior crimp region edge 38 and flat crimp region 40. During pressing, inward angled edge 39 facilitates inward migration of melted plastic from the region of flat crimp region 40 toward interior crimp-region edge 38. Additionally or alternatively, the crimping region may include an outer angled edge (not shown) separating flat crimp region 40 from exterior crimp region edge 42, which outer angled edge facilitates outward migration of melted plastic from the region of flat crimp region 40 toward exterior crimp region edge 42.

Although FIG. 8 illustrates crimping region 36 as a part of lower concave crimping jig 18a, in another embodiment (not shown), the crimping region is a part of the upper crimping jig, and the perimeter region of lower concave crimping jig is substantially flat. In another aspect (not shown), both the upper and lower crimping jigs include crimping regions (i.e., neither upper or lower crimping jig includes a substantially flat region at the periphery thereof).

Figure 10:
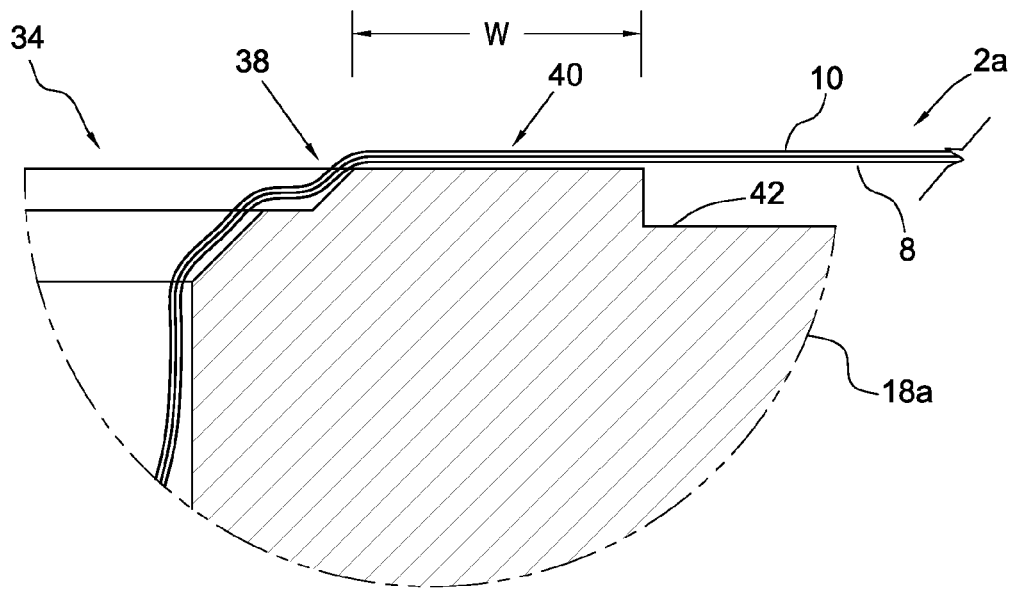
FIG. 10 illustrates a further close-up cross section view of crimping region 36 with lower sealing foil 2 placed against the lower crimping jig.

FIG. 10 illustrates crimping region 36 with lower sealing foil 2a placed against lower concave crimping jig 18a, and after orifice 34 has accepted sealing foil 2a, but before upper sealing foil 2b and upper flat crimping jig 18b have been pressed against lower sealing foil 2a and lower crimping jig 18a. Ultimately, force is applied by pressing upper flat crimping jig 18b and upper sealing foil 2b against lower sealing foil 2a and lower crimping jig 18a, preferably in the presence of heat (either or both lower concave crimping jig 18a and/or upper flat crimping jig 18b may be heated) to form crimped fluid-containing pouch 100. As indicated above, the plastic sides of foil 2a, 2b preferably are facing or abutting one another such that the plastic from foil 2a and foil 2b are melted into one another and migrate inwardly and/or outwardly from flat crimp region 40 to form interior and/or exterior plastic seal beads, respectively.

Figure 22:
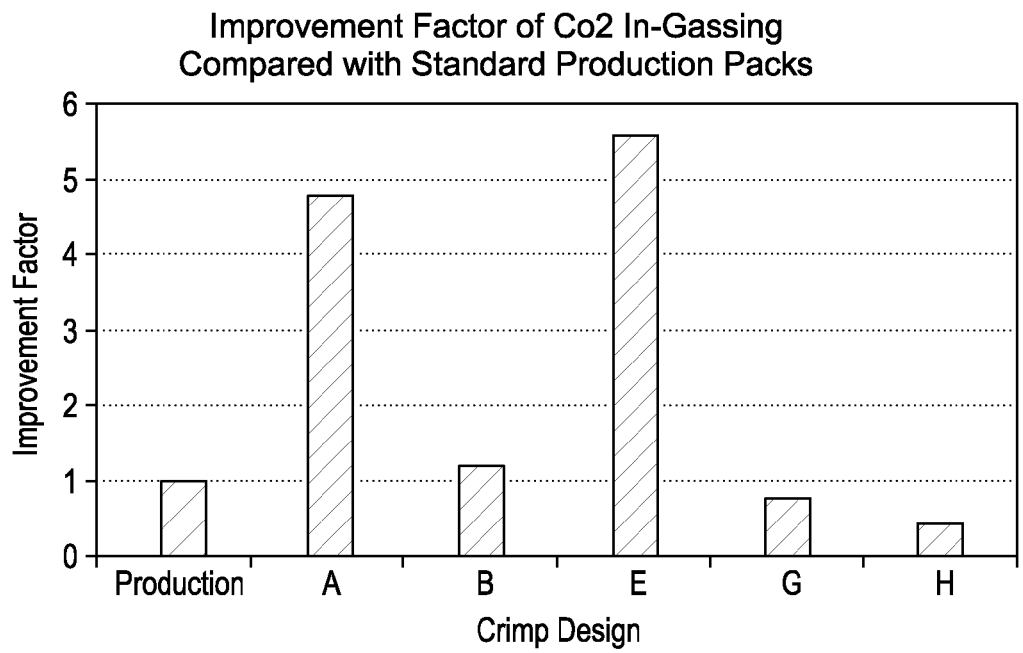
FIG. 22 is a plot of the improvement factor tabulated in FIG. 21 for each of several seal designs according to various embodiments of the present invention.

The width (W) of flat crimping region 40 may vary widely. Several different design variations (A-H) were tested to determine the impact that the width of flat crimp region 40 had on the ability of fluid-containing pouch 100 to withstand $CO_2$ in-gassing. Several design dimensions, A, B, C, and D, are shown in FIGS. 7A-7C. The design parameters for test designs A-H are provided in FIG. 21. In one embodiment, the difference between dimension A and B provides the width of flat crimp region 40 on two sides of fluid-containing pouch 100 ([A–B]/2 for a single side), and the difference between dimensions C and D provide the width of flat crimp region 40 on the other two sides of fluid-containing pouch 100. In other aspects, the flat crimping region 40 is less than the difference between dimension A and B on two sides of fluid-containing pouch 100 (e.g., from 10 to 90 percent less, from 25 to 75 percent less, or from 45 to 55 percent less than the difference between dimensions A and B), and is less than the difference between dimensions C and D on the other two sides of fluid-containing pouch 100 (e.g., from 10 to 90 percent less, from 25 to 75 percent less, or from 45 to 55 percent less than the difference between dimension C and D). In those aspects in which the crimped region is less than the difference between dimensions A and B and/or dimensions C and D, the crimping regions preferably are centered between dimensions A and B or dimensions C and D, respectively. The results are tabulated in FIG. 21, are shown graphically in FIG. 22, and are discussed in greater detail below. FIG. 21 also tabulates the sealing area, in inches squared, which is a function of the A, B, C, and D dimensions.

FIG. 5 illustrates a micrograph of a cross-section of a seal region of a conventional fluid-containing pouch 100 after heat pressing. The micrograph shows that plastic seal region 12 has a substantially uniform thickness across the seal. The effect of the crimping step according to an exemplary embodiment of the invention, in contrast, is shown in the micrographs of FIGS. 6A & 6B. As shown, some of the plastic 10 of both the upper and lower sealing foil 2 has been extruded from seal region 12 into the interior of fluid-containing pouch 100, i.e., away from crimped region 36, to form an interior plastic seal bead 14. Note also that the images clearly show that after crimping, the plastic layer in crimped region 36 is substantially reduced in thickness, as it is forced towards both the outer edge of the crimped region 36 and the interior of the crimped region 36. The thickness of the seal in the crimped region may vary widely, but in some exemplary embodiments ranges from 2 to 30 µm, e.g., from 2 to 20 µm or from 2 to 10 µm. In those embodiments in which the thickness varies across the crimped region, these ranges refer to the average thickness across the crimped region.

In the embodiments shown in FIGS. 6A & 6B, the initial manufactured thickness of plastic layer 10 on each layer of sealing foil is about 0.0008 inches (or about 0.020 mm or 20 µm). Thus, the average thickness of the plastic prior to crimping is in the range of about 0.0016 inches or 40 µm taking into account both foil 2a and foil 2b. After crimping, the plastic seal region 12 preferably has an average thickness in the range of from about 1 µm to about 10 µm, from about 3 µm to about 7 µm, or preferably about 5 µm. Thus, this embodiment of the invention substantially reduces the cross-sectional plastic area of the entire seal by a significant factor. In a preferred embodiment, the total seal width is about 2 mm and the length of the seal perimeter is approximately 75 mm.

Many different crimping patterns may be employed in various embodiments of the invention. The effectiveness of the seals resulting from several exemplary test patterns are shown in FIG. 21. The various designs A-H had different selected sealing surfaces. Note that these pouch designs had an overall rectangular shape, as shown in FIGS. 7A-7C. As a result, the inner and outer seals of the long and the short axes of the rectangular designs have specified dimensions. For each of the designs A-H, a batch of pouches, each containing a calibrant fluid, was prepared for testing gas exchange. The Pouch Integrity Test (PIT) system and method are described in greater detail below.

Pouch Integrity Test

Figure 11A:
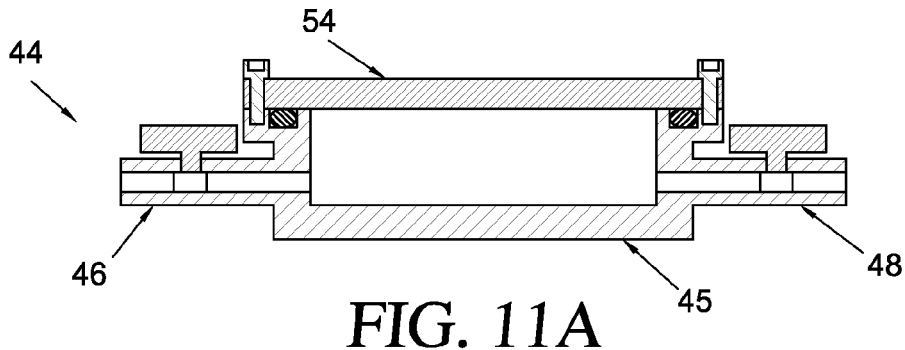
FIGS. 11A and 11B illustrate a gas control storage vessel used to store fluid-containing pouches in a controlled gas environment for an extended period of time at a controlled temperature.
Figure 11B:
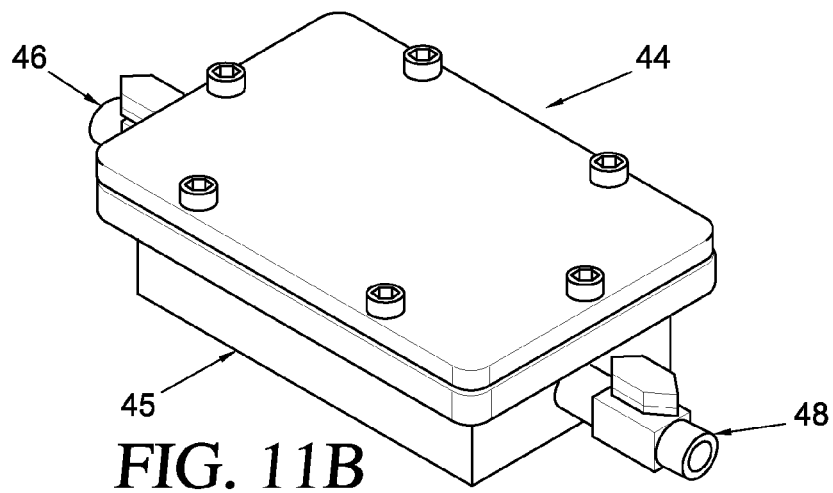
Figure 12:
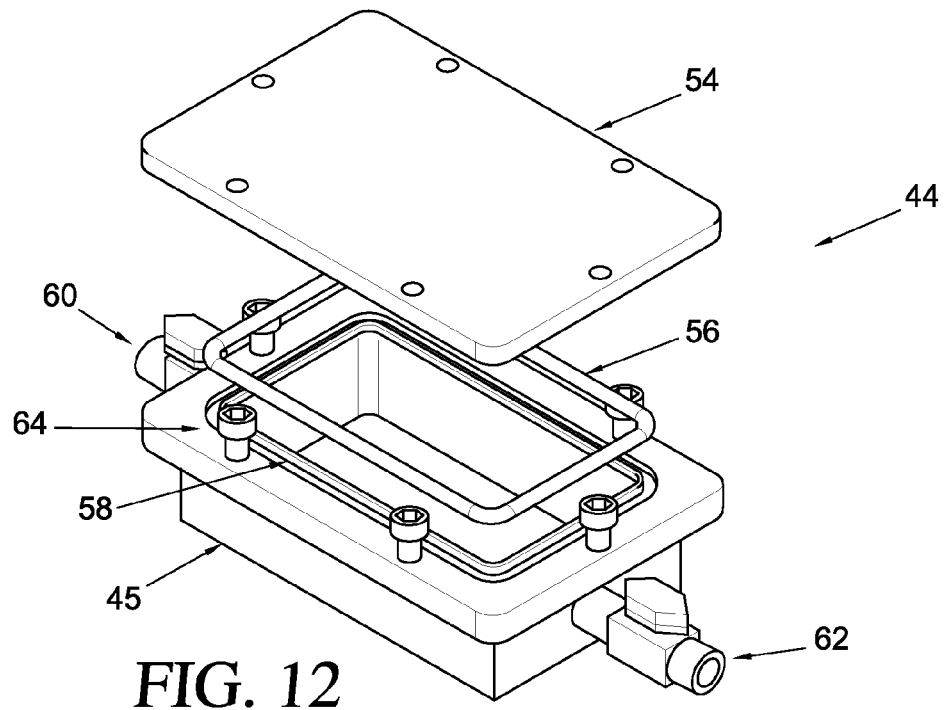
FIG. 12 illustrates a disassembled view of the gas control storage vessel as shown in FIGS. 11A and 11B.

FIGS. 11A and 11B illustrate gas control storage vessel 44 used to store fluid-containing pouches in a controlled gas environment for an extended period of time at a controlled temperature for the purpose of conducting the PIT, and FIG. 12 illustrates a disassembled view of gas control storage vessel 44 as shown in FIGS. 11A and 11B. Storage vessel 44 comprises sealable metal box 45 with gas inlet port 46 and gas outlet port outlet 48. The storage vessel 44 enables incubation of fluid-containing pouches under controlled conditions, e.g., temperature, pressure and external gas composition prior to testing. Fluid-containing pouches placed in the storage vessel 44 can be incubated for different time periods and then tested to determine the amount of gas exchange that has occurred through the seal. In the PIT, calibrant pouches are ruptured with a capillary tube or syringe and the contents introduced into a chemical analysis system, e.g., a commercial blood gas analyzer or clinical chemistry analyzer. Those skilled in the art will recognize that commercial blood gas analyzers test for $pO_2$, $pCO_2$ and pH, and have sample introduction ports that can accommodate samples delivered by means of a capillary tube or syringe barrel. Note that the PIT is not dependent on a specific apparatus for determining gas composition. The important factor is that the testing means provide a reliable way of determining the dissolved gas composition of a sample before and after incubation in vessel 44. Furthermore it is recognized that as the pouches are single-use disposable components, it is necessary to make a batch of pouches in the same manner and then test portions of the batch at different stages of the PIT process to determine the overall performance of the seal design through time.

The PIT was performed as follows. Fluid-containing pouches are placed into storage vessel 44, ensuring that the samples are not covering gas inlet port 46 and gas outlet port 48 on the inside of storage vessel 44. O-ring 56 is then cleaned and placed in o-ring groove 58, verifying that the area and o-ring 56 are free of any contaminants that might prevent a proper seal. Lid 54 of storage vessel 44 is then sealed to sealable metal box 45 using the supplied hardware, where six bolts 64 are tightened in a cross pattern. Inlet valve 60 and outlet valve 62 on storage vessel 44 are then opened, and inlet valve 60 is connected to a $CO_2$ gas cylinder (not shown). A flow of $CO_2$ gas, preferably at least ten times the volume of storage vessel 44, is used to flood storage vessel 44 for a minimum of about 15 minutes. Finally, inlet valve 60 is closed and then outlet valve 62 is closed. Storage vessel 44 is then stored in the desired test environment, e.g., at a controlled temperature.

In the PIT described herein, each fluid-containing pouch contained the following: 160 μL of an aqueous solution containing glucose (90 mg/dL), urea (4.0 mM), sodium (118 mM), potassium (4.0 mM), chloride (100 mM), calcium (1.5 mM) and lactate (2.0 mM) in 47 mM HEPES buffer at pH 7.3. Of course, other fluids may be employed and analyzed under the PIT depending on the specific purpose of the pouch to be tested. Sufficient bicarbonate was also present to give an initial $pCO_2$ of 28 mm Hg, where the gas phase in the pouch is about 100 μL. In the PIT, the pouch is stored in the above-described incubation vessel at 1 atmosphere of carbon dioxide for a period of 8 days. The experiments were performed at a temperature of 50° C. The initial $pCO_2$ in the pouches was measured and the $pCO_2$ in the pouches were again measured at the end of the experiment. Typically, the $pCO_{2(initial)}$ is determined by bursting a first pouch with a capillary, and the $pCO_{2(end)}$ is determined in the same manner but from a second pouch formed in the same batch as the first pouch. The difference between the $pCO_{2(initial)}$ and $pCO_{2(end)}$ provides a $\Delta pCO_2$ value, which is indicative of pouch integrity, with lower $\Delta pCO_2$ values reflecting less gas exchange and, hence, a better seal.

Each of the proposed designs were assessed in an accelerated testing mode using the incubation vessel described above. Several samples of fluid-containing pouches (A-H) were placed in the incubation vessel at 1 atmosphere of carbon dioxide and stored for a period of 8 days. The experiments were performed at a temperature of 50° C. The initial $pCO_2$ in the pouches was measured (generally about 28 mm Hg) and the $pCO_2$ was again measured at the end of the experiment. For the standard process, with conventional seals, the final $pCO_2$ was about 60 mm Hg. This was due to ingress of $CO_2$ through the seal, as described above. This 32 mm Hg $\Delta pCO_2$ value was used as a baseline result against which the various crimping designs were tested. The table in FIG. 21 lists an Improvement Factor, which is defined herein as $\Delta pCO_2$ for the standard process divided by the $\Delta pCO_2$ for the new process. For design A, the $\Delta pCO_2$ value was much less than the 32 mm Hg observed for the standard process, giving an improvement factor of 4.8. Improvement factors for other designs are listed in FIG. 21 and shown graphically in FIG. 22, with design E providing the best result. Design E was used in the testing described immediately below.

Long-Term Stability Studies

The next set of experiments were designed to indicate the long-term performance of design E under normal storage conditions, i.e., ambient air either refrigerated or at room temperature. These experiments were also performed in an accelerated mode, i.e., by storing the test sample at 50° C. Those skilled in the art will recognize that satisfactory results obtained in the accelerated mode should be indicative of similar or (more likely) better performance at ambient or refrigerated temperatures as gas permeability of plastics generally increases with temperature.

The head-space or gas phase in fluid-containing pouch 100 of design E has a volume of about 100 μL, and the partial pressure of $CO_2$ within fluid-containing pouch 100 was similar to that found in a blood sample, e.g., about 28 mm Hg. In contrast, the $CO_2$ concentration in ambient air is about 0.03%, or about 0.24 mm Hg. This is substantially less and thus the driving force is for $CO_2$ loss from fluid-containing pouch 100. The driving force is based on the law of mass action; the net process will be for $CO_2$ to slowly diffuse out through the plastic seal and exit the fluid-containing pouch 100. Those skilled in the art will recognize that tests similar to the PIT experiments, discussed above, can be performed with ambient air instead of carbon dioxide gas. Using carbon dioxide at 1 atmosphere (760 mm Hg) provides a driving force for ingress of $CO_2$, whereas ambient air provides a driving force for egress. Both can provide information about the seal integrity, however the PIT uses a carbon dioxide atmosphere as it is easier to measure an increase in pouch $pCO_2$ and also results are obtained more quickly due to the greater driving force. Note that an elevated temperature is used to increase the rate of gas transport, with the intention of observing a demonstrable difference between the two types of pouches, e.g., crimped according to an exemplary embodiment, and a conventionally sealed fluid-containing pouch 50.

To determine any change in the internal initial partial pressure of $CO_2$ of fluid-containing pouch 100, a subset of fluid-containing pouches 100 were intermittently tested. Specifically, at times of 0, 30, 60, 90, 120, 150, and 180 days, both fluid-containing pouches 100 and conventional fluid-containing pouches 50 were removed from the ambient air incubator at 50° C. and tested. This was done by assembling them into i-STAT EG7+ cartridges and testing the resulting partial pressure of carbon dioxide ($pCO_2$) versus a tonometered control fluid at a $pCO_2$ of 28 mm Hg. Note that $pCO_2$ is a standard test offered by the i-STAT system using an electrochemical $pCO_2$ sensor.

For background, it is important to note that the test algorithm in the i-STAT reader assigns a value of 28 mm Hg to the signal recorded in the calibration fluid. This is a factory calibration process, where the reader is pre-programmed with software that assumes the calibrant fluid $pCO_2$ value will be 28 mm Hg, and fluid-containing pouches 100 are manufactured with a fluid composition that is intended to be 28 mm Hg. Once a batch of fluid-containing pouches 100 were made and assembled into test devices, a statistically valid sample of the batch was tested to determine whether the intended $pCO_2$ value is actually observed. If so, the batch of fluid-containing pouches 100 can be assembled into cartridges and then shipped to customers.

Figure 23:
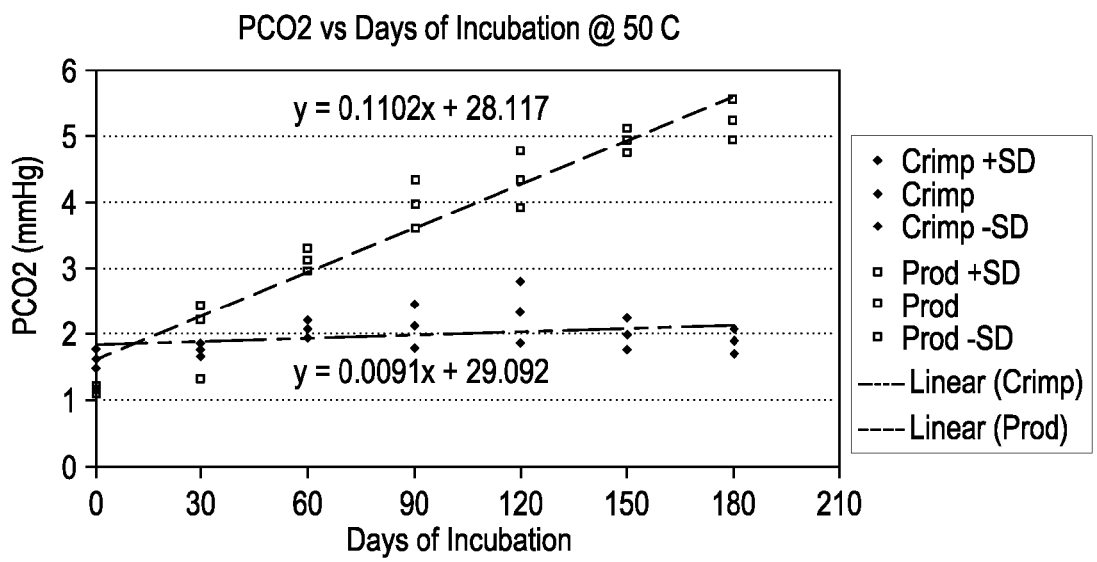
FIG. 23 illustrates a data plot of carbon dioxide ($CO_2$) pressure versus time for two sets of fluid-containing pouches stored at 50° C. over a period of about 180 days, wherein a first set of fluid-containing pouches has been sealed in a conventional manner, and wherein a second set of fluid-containing pouches have been sealed using a method according to an embodiment of the present invention.

Consequently, if the calibrant fluid and the tonometered fluid in the experiment both have a concentration of about 28 mm Hg, then this will be the reported value (see data points in FIG. 23). However, if $CO_2$ has been lost from fluid-containing pouch 100 and the actual value is, for example, 10 mm Hg, because the reader will assign the pre-programmed 28 mm Hg value to the signal from the calibrant fluid, when the sensor is challenged with a tonometered sample that is actually 28 mm Hg, the reported value will be higher. The degree to which the reported value is higher than 28 mm Hg is a measure of how much $CO_2$ has been lost from the pouch during storage.

FIG. 23 illustrates a data plot of carbon dioxide ($CO_2$) partial pressure versus time for two sets of fluid-containing pouches stored at 50° C. over a period of about 180 days, wherein a first set of fluid-containing pouches 50 has been sealed in a conventional manner, and a second set of fluid-containing pouches has been crimped using a method according to an exemplary embodiment (design E) of the invention. In FIG. 23, the diamonds represent $pCO_2$ values for fluid-containing pouches of design E, and the squares represent $pCO_2$ values for conventional fluid-containing pouches 50, both of which were stored at 50° C., with a calculated linear fit through the data points. Initially, the $pCO_2$ in both sets of pouches read about 28 mm Hg. However, after 180 days, the $pCO_2$ in the standard pouches had fallen sufficiently to cause the tonometered fluid sample to read about 47 mm Hg, whereas fluid-containing pouches manufactured according to design E have only changed slightly to read about 31 mm Hg.

This is a surprising, unexpected and significant result since the crimping step could have been expected to have a deleterious effect on the seal despite narrowing the seal cross-section. For example, the creation of microscopic fissures in either of both of plastic layer 10 or foil layer 8 sealing foil 2 would be expected to decrease pouch performance. As a result, is has been surprisingly found that the crimping feature substantially improves the seal by reducing gas exchange.

As described above, it will also be apparent that $CO_2$ loss may alternatively be determined by rupturing a fluid-containing pouch 100 (or conventional fluid-containing pouch 50) and filling a glass capillary tube with a portion of the fluid in the fluid-containing pouch. The fluid is then transferred to a standard bench-top blood gas analyzer, where the fluid is injected and a $pCO_2$ result is reported by the analyzer. In these experiments, it was also shown that the fluid-containing pouches of design E had a substantially unchanged $pCO_2$ value after 180 days at 50° C., whereas conventional fluid-containing pouches 50 exhibited a loss of $CO_2$.

Burst Strength Tests

Figure 24:
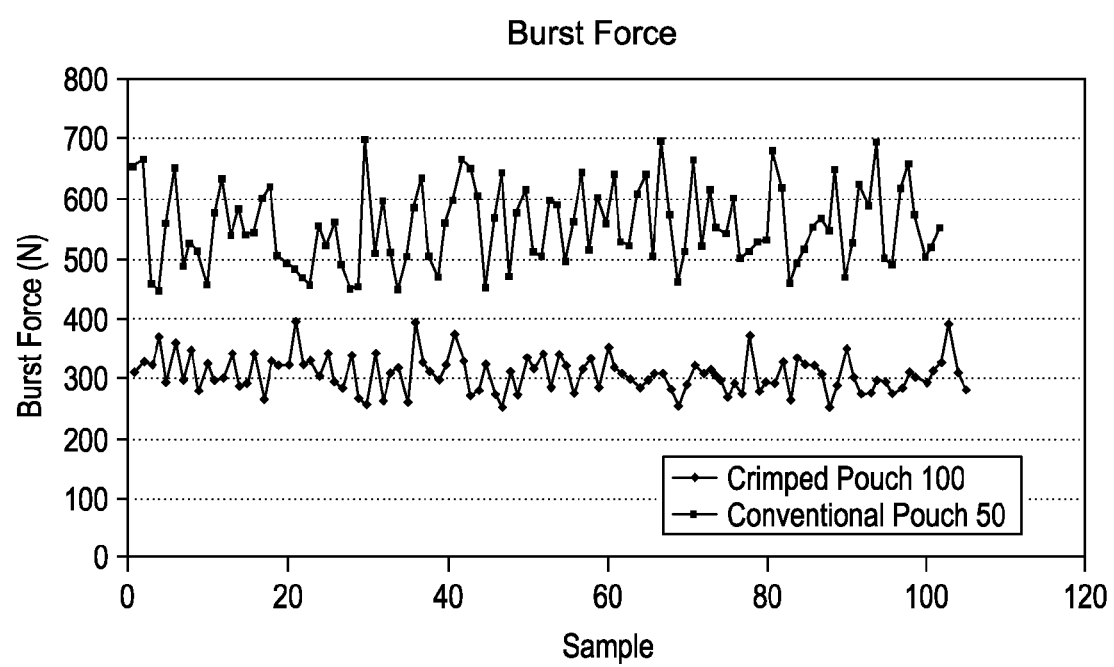
FIG. 24 illustrates a data plot of burst strength comparing burst strength variability for the first set of fluid-containing pouches and the second set of fluid-containing pouches.

The conclusions based on the data in FIG. 23 were confirmed by separate experiments on the burst strength of fluid-containing pouch 100. In the burst strength test, a different jig was used to determine the force required to burst fluid-containing pouch 100, i.e., cause destructive failure of the seal. In circumstances where the crimping causes damage to the seal, this would result in a more variable burst strength of the seal. As shown in FIG. 24, while the burst strength of conventional fluid-containing pouch 50 is higher (averaging 551.7 N with n=102 and a standard deviation of 66.1 (12%)), it is more variable than fluid-containing pouch 100 according to an exemplary embodiment design E (averaging 307.2 N with n=105 and a standard deviation of 30.7 (10%)). It was found that the more consistent burst strength, i.e., lower absolute variation, of design E of fluid-containing pouch 100 is indicative of a more reliable and reproducible process. Note that the lower burst strength is indicative of the reduced amount of Primacor™ adhesive in the seal region.

As described above, FIG. 21 illustrates a table showing different crimping designs, where design E corresponds to a preferred embodiment of fluid-containing pouch 100. These results also indicate that the crimping process can yield an improved and viable manufacturing process suitable for high volume demand. A desirable crimp design is one in which the gap between foil layers is substantially minimized. However, the crimp must not disrupt the integrity of the polymer (plastic) liner 10 of sealing foil 2 due to the potentially corrosive nature of the fluid contained within fluid-containing pouch 100 and its interaction with aluminum layer 8. Nor should the crimp cause fissures or other damage to aluminum layer 8.

Through further experimentation and design it was found that the following features reflect preferred embodiments for fluid-containing pouches. According to a preferred embodiment, the two portions of sealing foil 2 are rectangular, e.g., 1.5 cm×2.2 cm, with an area of about 3.3 $cm^2$. It was found that useful foil areas can range from about 0.5 $cm^2$ to 20 $cm^2$.

According to a preferred embodiment, the volume of the enclosure of fluid-containing pouch 100 is about 100 to 300 μL, however pouches with internal volumes in the range of about 5 μL to about 5 mL may be used. Thus, the volume of the liquid phase in the enclosure can be in the range of about 5 μL to about 5 mL. Likewise, the volume of the gas phase in the enclosure can be in the range of from about 5 μL to about 5 mL.

According to a preferred embodiment, the volume of the liquid phase in the enclosure is about 50% to 95%, e.g., from 60% to 65% of the total volume of the enclosure. In addition, the volume of the gas phase in the enclosure can be in the range of about 5% to about 50% of the volume of the enclosure.

According to a preferred embodiment, a portion of plastic layer 10 is forced by the act of sealing and crimping into the enclosure, and forms interior plastic seal bead 14 along at least a portion of the interior perimeter of the seal, as shown in FIGS. 6A & 6B. This process accommodates the plastic that is lost from the seal region during sealing and crimping. As can be seen in FIGS. 5 and 6, the average thickness of plastic in the perimeter seal is substantially less, and at least 20% less than the original combined thickness of the two plastic layers 10.

According to a preferred embodiment, the perimeter seal has a perimeter width (or gas diffusion path-length) of less than about 20 mm, e.g., less than about 10 mm or less than about 5 mm. In terms of ranges, the perimeter seal optionally has a width of from about 1 mm to about 20 mm, and most preferably about 2 mm to about 3 mm. The perimeter width preferably is equal to or less than the length defined by half A minus B, or half C minus D, as shown in FIG. 7A. The specific perimeter width typically will be determined by the width of the crimping region. In addition, according to the preferred embodiment, the perimeter seal has a perimeter length of from about 1 cm to about 20 cm, and most preferably from about 7 cm to about 8 cm, as shown in FIG. 7A, i.e., the length defined by 2A plus 2C.

Figure 25:
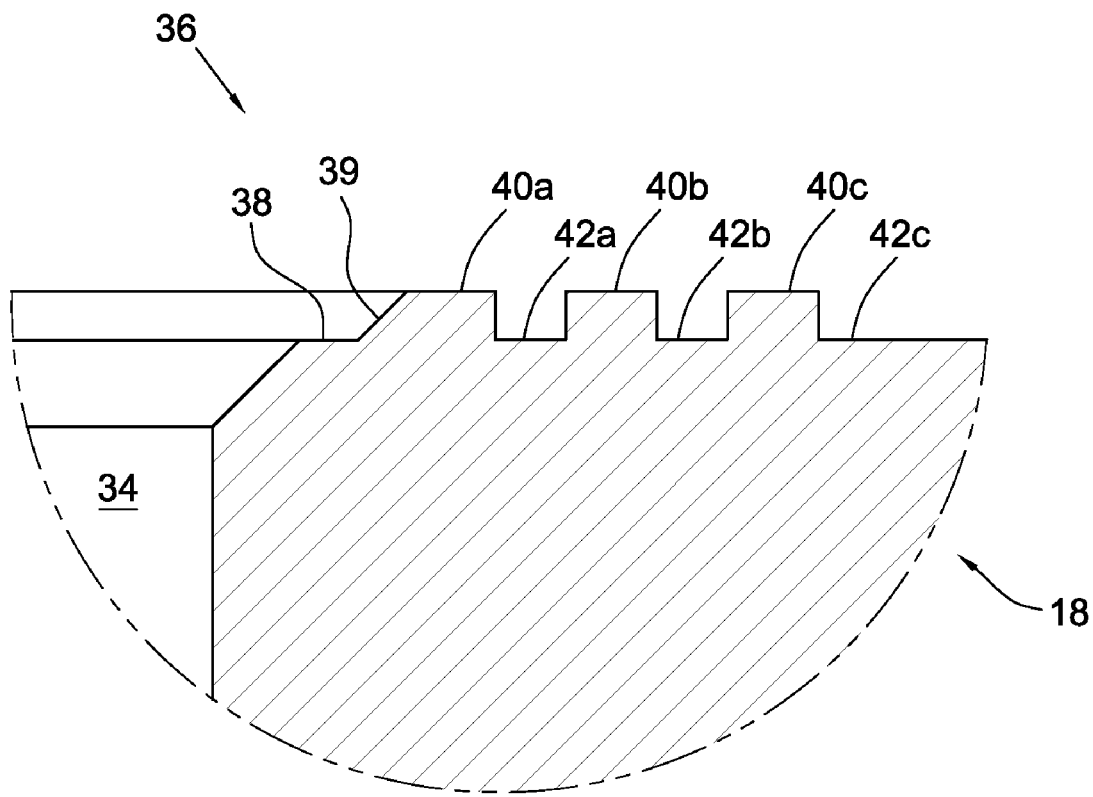
FIG. 25 illustrates a close-up cross sectional view of a crimping region of crimping jig according to an alternate embodiment of the present invention.

While a preferred embodiment of an apparatus for crimping fluid-containing pouch 100 is shown in FIGS. 8 and 9, the crimped feature may also be comprised of multiple concentric crimping rings, wherein the rings may number from, for example, from 2 to 10 crimping rings. In this context, the term "rings" and "concentric" is not limited to circular shapes, as square or rectangular crimped features are preferred. Typically these will have rounded corners. For example, referring to FIG. 9, flat crimp-region 40 can be divided evenly into five parts, wherein an inner, outer and central portion are of the same height as depicted for flat crimp-region 40, with the two other portions on either side of the central portion having the height depicted for region 52. This configuration is shown in FIG. 25, and acts to form three concentric crimping rings. As shown, the rings are formed from peaks 40a, 40b, and 40c, and are separated by gaps corresponding to valleys 42a, 42b and 42c. Of course, many other patterns may similarly be formed by varying the number and/or widths of the peaks.

Exemplary fluid-containing pouches manufactured in accordance with the inventive principles discussed and described herein have proven successful in calibrating blood testing sensors. In addition, the fluid-containing pouches of the invention exhibit an extended shelf-life with refrigeration, and also remained substantially unaltered with extended room temperature storage, e.g., six months. The fluid-containing pouches of the invention preferably have a room temperature shelf life greater than 3 months, greater than 6 months, greater than 9 months or greater than 1 year. As a result, the fluid-containing pouches of the invention offer the advantage of simplifying shipping for the manufacture of test cartridges containing the inventive fluid-containing pouches, and also simplifying storage of cartridges for hospitals and other users.

Figure 13:
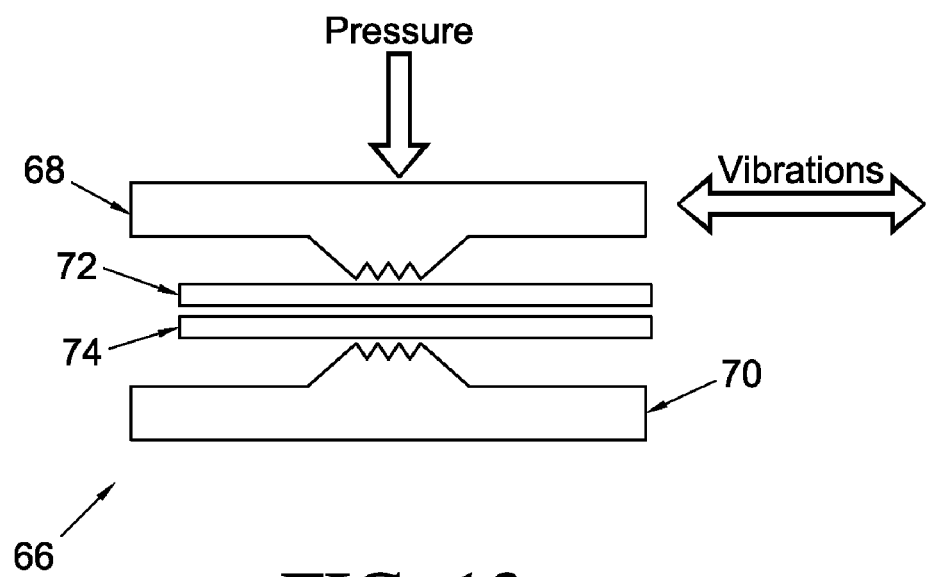
FIG. 13 illustrates an ultrasonic welding system according to an embodiment of the present invention.

According to an alternate exemplary embodiment, fluid-containing pouches having a substantially liquid and gas impermeable seal can be manufactured using an ultrasonic welding machine 66, shown in FIG. 13. Those of ordinary skill in the art will recognize that polymers may be characterized by their gas transmission rate and therefore are non-hermetic materials. It is therefore also considered advantageous to obtain metal-to-metal sealing as metals, e.g., aluminum, in the absence of pinholes are generally impervious to gases. The advantages of metal-to-metal sealing needs to be balanced, however, against possible interactions of the calibrant fluid with the metal, as described above. The use of an intervening inert polymer layer obviates this potential problem.

At least two additional types of sealing foil can be used with ultrasonic welding machine 66 according to various exemplary embodiments: the first is the Primacor-coated aluminum foil of the type described above (i.e., sealing foil 2, with foil layer 8 and plastic layer 10), and the second is a lacquer-coated sealing foil (sealing foil 2', with foil layer 8 and lacquer layer 11). According to an exemplary embodiment, it is desirable to have lacquer layer 11 present on foil layer 8 to avoid direct contact between the calibrant fluid and the aluminum. The lacquer may comprise, for example, one or more of nitrocellulose, urea and acrylic resins, and may be applied, for example, by printing. The quantity of lacquer applied is generally about 0.1 to about 10 g/m$^2$ and preferably about 1.5 g/m$^2$.

FIG. 13 illustrates welding machine 66 according to an exemplary embodiment. Ultrasonic welding is achieved by application of pressure to parts held between stationary multi-ridged plate 70 and mobile multi-ridged plate 68, which vibrates at an ultrasonic frequency. The action of rubbing the stationary part of sealing foil 74 against the mobile part of sealing foil 72 causes oxides to be dispersed allowing metal-to-metal bonding to occur. Of course, in other embodiments, the lower plate may vibrate instead of or in addition to the upper plate.

Figure 14:
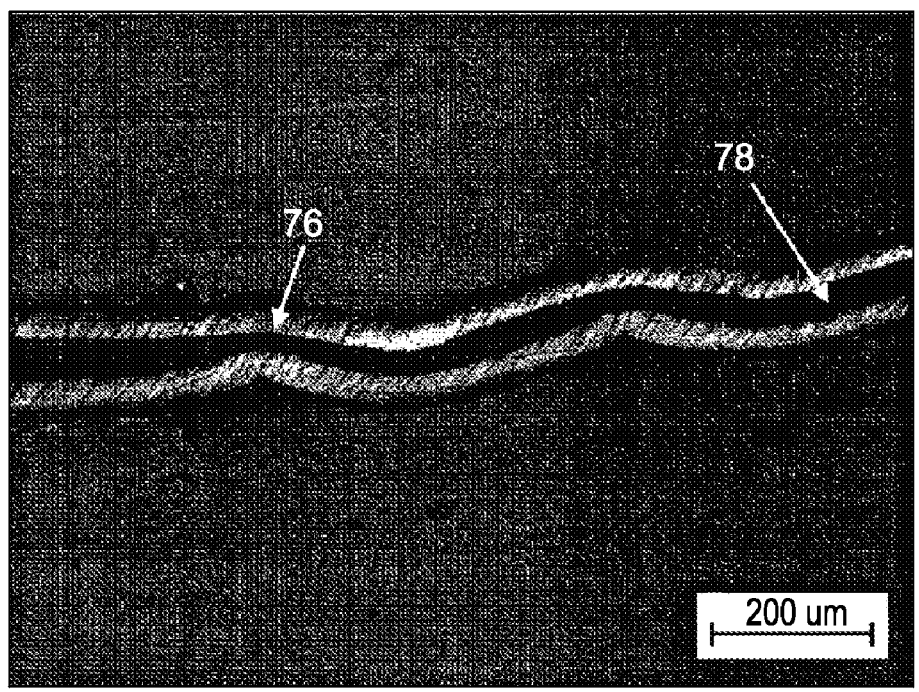
FIG. 14 is a micrograph of a cross-section of a seal region of a fluid-containing pouch manufactured according to an ultrasonic welding embodiment of the present invention with Primacor located between upper and lower sealing foil layers of the fluid-containing pouch.
Figure 15A:
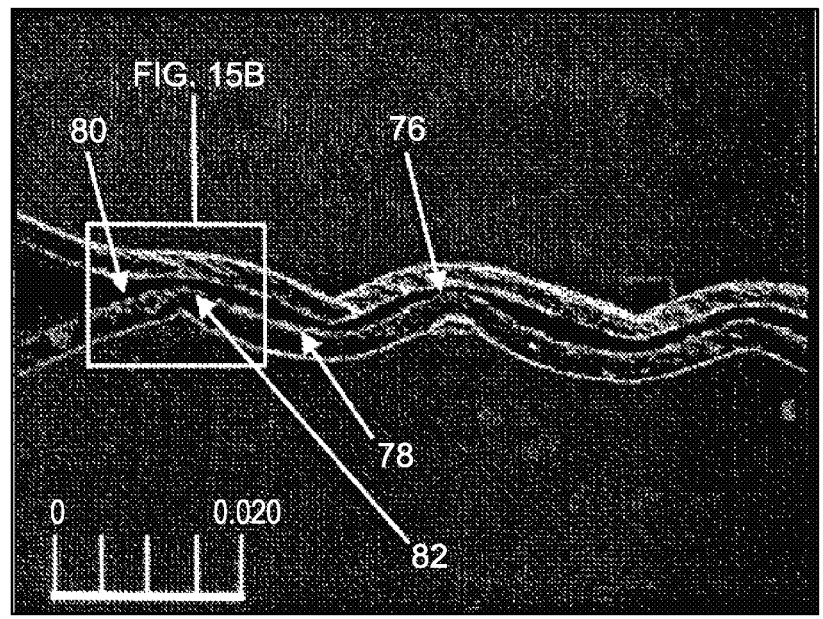
FIG. 15A is a micrograph of a cross-section of another seal region of a fluid-containing pouch manufactured according to an ultrasonic welding embodiment of the present invention with Primacor located between upper and lower sealing foil layers of the fluid-containing pouch.
Figure 15B:
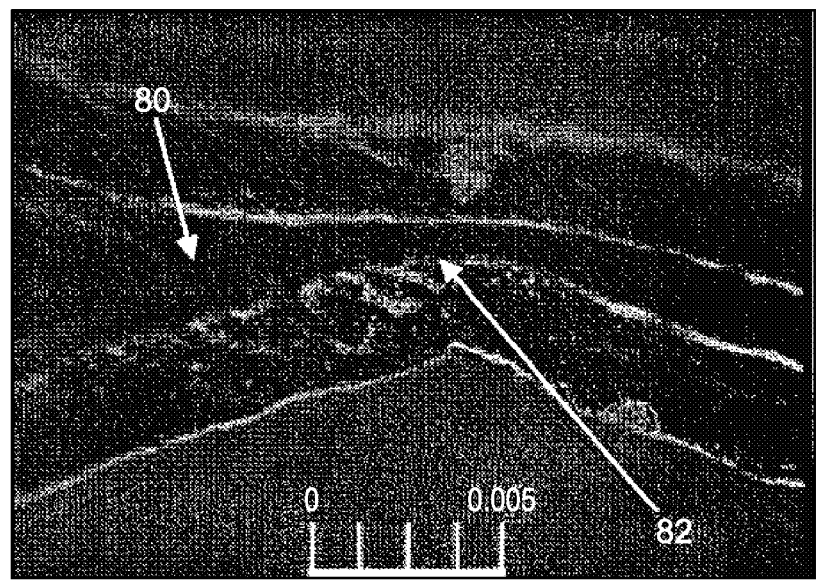
FIG. 15B is a close up cross sectional view of a region of FIG. 15A.

FIG. 14 illustrates a micrograph of a seal region formed using sealing foil 2 having a plastic layer (formed of Primacor™) and formed from an ultrasonic welding machine having ridged plates. FIG. 14 shows that the 38 μm upper sealing foil 2b and lower sealing foil 2a above and below the seal are undamaged, and that a contiguous layer of Primacor (of variable thickness ~5-30 μm) remains. The seal shown in FIG. 14 has a first plastic region 76 and a second plastic region 78, which is thicker than the first plastic region. FIGS. 15A & 15B show a micrograph of a similar seal region also formed by ultrasonic welding and having a first plastic region 76 with a plastic layer that is about 5 μm thick and a second plastic region 78 having a plastic layer that is about 15 μm thick.

According to an exemplary embodiment, substantially no direct metal-to-metal contact or bonding occurs even in the thinner regions, as shown in region 82 of FIGS. 15A & 15B. Specifically, region 82 represents a region where the thickness of plastic layers 10a, 10b is about 10 μm. Region 80 represents a region where the thickness of plastic layers 10a, 10b is about 30 μm.

Figure 16:
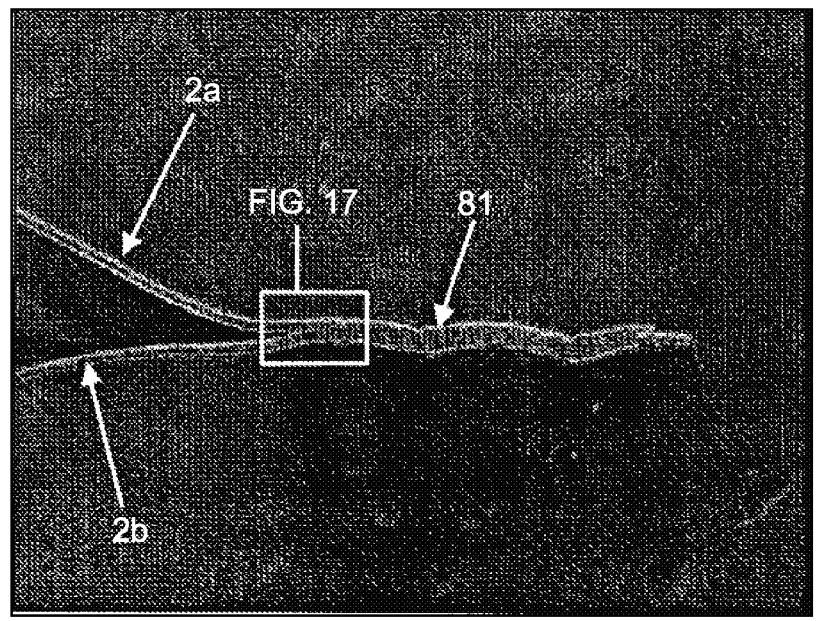
FIG. 16 is a micrograph of a cross-section of a seal region of a fluid-containing pouch manufactured according to an ultrasonic welding embodiment of the present invention with lacquer located between two sealing foil layers of the fluid-containing pouch.
Figure 17:
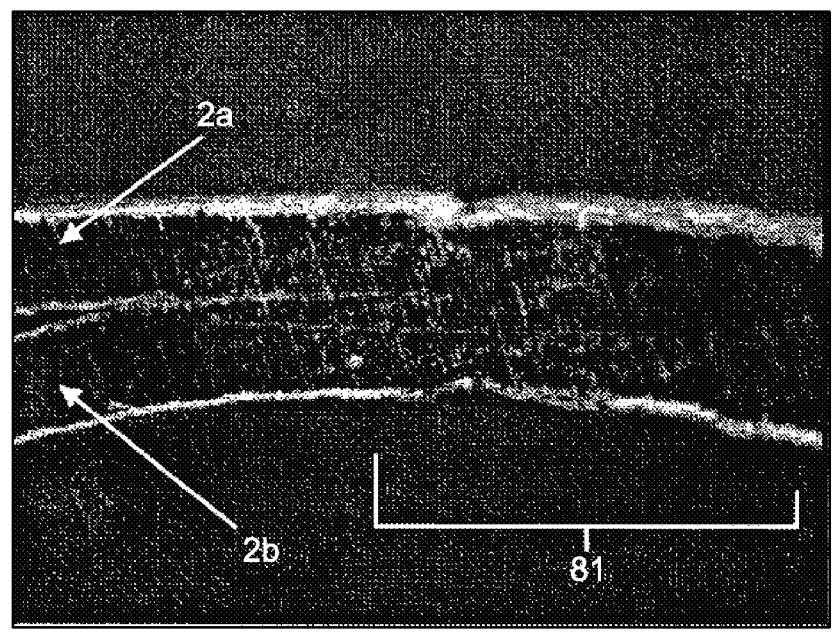
FIG. 17 is a close-up view of a portion of the cross-section shown in FIG. 16.

FIG. 16 is a micrograph of the seal region formed with by ultrasonic welding of sealing foils having abutting protective lacquer layers. The embodiment shown is formed from an ultrasonic welding machine having substantially flat plates. FIG. 16, and especially FIG. 17, which is a close-up of the seal region shown in FIG. 16, shows that there is a minimal gap between upper sealing foil layer 2a, and lower sealing foil layer 2b, and that in some regions, there is metal-to-metal contact, as shown in region 81 of the enlarged view in FIG. 17.

Thus, according to exemplary embodiments, it is evident that seals made by ultrasonic welding machine 66, as with crimping seals made by crimping jigs 18a, b, can also advantageously minimize or eliminate gas exchange between the interior of the fluid-containing pouch and the exterior ambient air.

Figure 18:
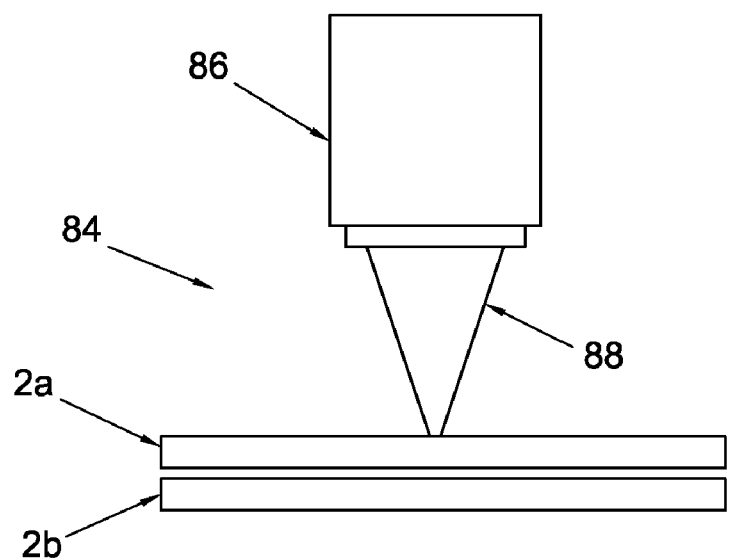
FIG. 18 illustrates a laser welding system according to an alternate embodiment of the present invention.

In another embodiment, the substantially liquid and gas impermeable seal is formed by a laser welding system. FIG. 18 illustrates laser welding system 84. Laser welding can also be usefully applied to seal fluid-containing pouches using a Primacor-coated sealing foil or a lacquer-coated sealing foil. Laser welding is achieved by placing two sheets, e.g., foil, in intimate contact followed by application of a sufficiently high power density of laser light (approximately 107 watt/inch$^2$ for aluminum) to cause melting of the materials. A laser welding system 84 for welding thin materials, such as polymer-coated sealing foils, is depicted in FIG. 18. In this depiction, laser optics 86 are used to focus laser light, using laser optic guide 88, to a sufficiently high energy density to cause melting of both upper sealing foil 2b, and lower sealing foil 2a. Alternative weld geometries are also possible with laser welding, for example, to form abutted or T-weld joints.

According to a preferred embodiment, laser welding machine 84 achieves hermetic laser welding of sealing foil 2a, 2b with a pulsed neodymium YAG laser coupled via laser optics 86 and laser optics guide 88. The laser pulse width is approximately 1.5 milliseconds in duration and the energy delivered per pulse is about 1.0 Joule. A continuous weld (or seal) can be achieved by overlapping of the laser pulses by translating the assembly, i.e., the position of sealing foil 2a, 2b relative to laser welding machine 84, at a rate, for example of about 1-20 mm/s, preferably 5 mm/s.

Figure 19:
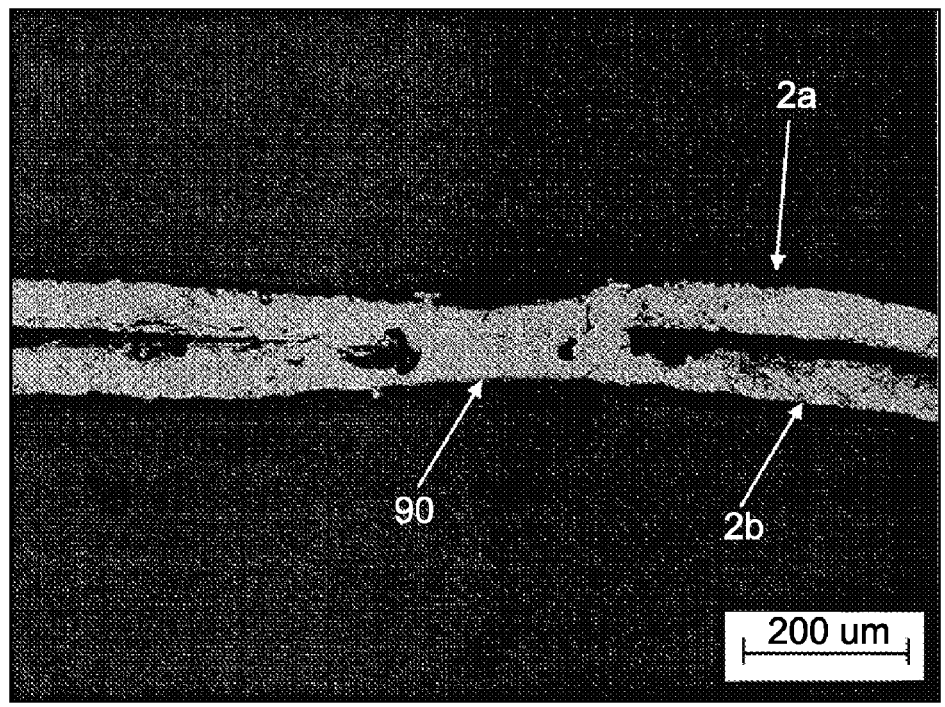
FIG. 19 is a micrograph of a cross-section of a seal region of a fluid-containing pouch manufactured according to an alternate embodiment of the present invention, using laser welding with Primacor located between two sealing foil layers of the fluid-containing pouch.
Figure 20A:
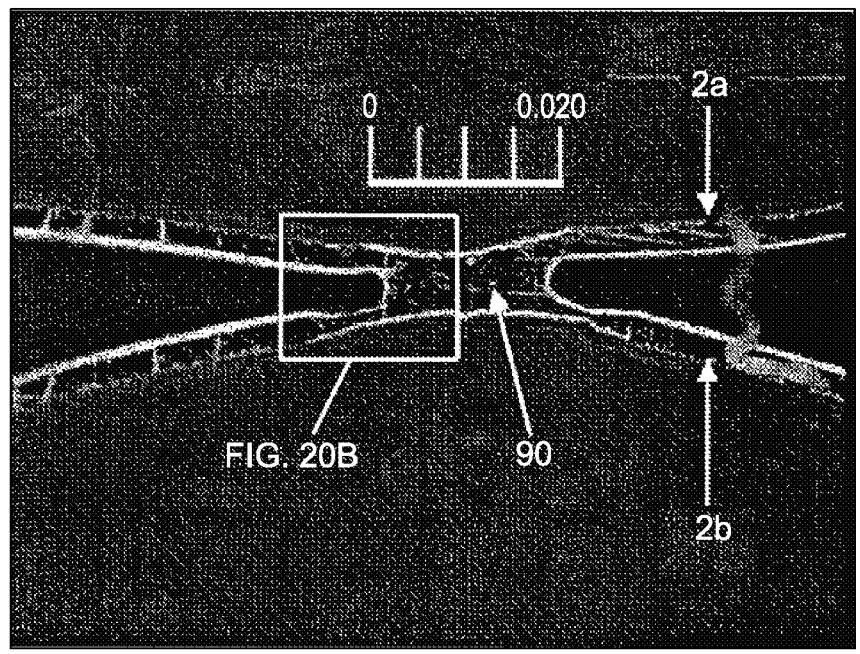
FIG. 20A is an additional micrograph of a cross-section of a seal region of a fluid-containing pouch manufactured according to an alternate embodiment of the present invention, using laser welding with Primacor located between two sealing foil layers of the fluid-containing pouch.
Figure 20B:
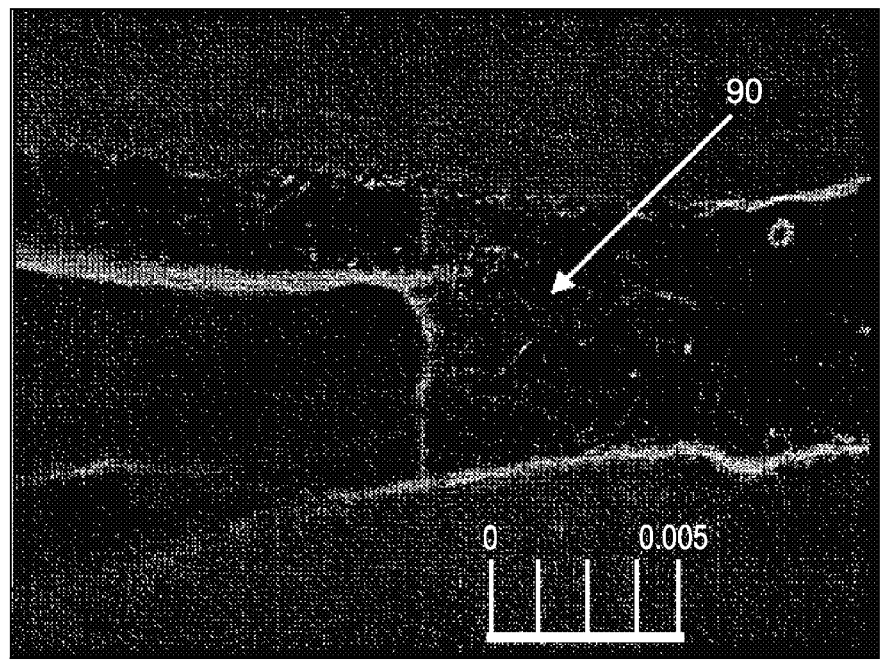
FIG. 20B is a close-up view of FIG. 20A.

In order to demonstrate that laser welding machine 84 can generate a metal-to-metal seal using the Primacor-coated seal foil 2 (i.e., sealing foil 2 with foil layer 8 and plastic layer 10), sealing foil layers 2a, 2b were inverted so that foil layers 8a, 8b abutted each other. FIG. 19 is a micrograph of the seal region, and illustrates that there is no gap between upper and lower sealing foil layers 2b, 2a and a metal-to-metal bond is formed at laser sealed region 90. FIG. 20A provides an additional micrograph of one side of a weld having laser sealed region 90, and FIG. 20B shows a close-up view of a region of FIG. 20A. As mentioned previously, a full metal-to-metal seal is highly desirable as it eliminates the opportunity for gas exchange through a plastic seal and hence forms a substantially liquid and gas impermeable seal. Note that the metal-to-metal bond can also be formed by abutting the foil layers with plastic layers together, and performing the laser welding process. Here, the plastic in the seal region is preferably vaporized to allow for metal-to-metal bond formation.

According to an alternate embodiment, full metal-to-metal sealed fluid-containing pouches 100 can be manufactured in which the fluid contained is entirely encapsulated within polymer provided that patterned polymer-on-foil is available. Polymer patterned foil can be produced by either spatially controlled addition of polymer to foil or by selective removal of polymer from an entirely polymer-coated foil. Examples of methods that may be used to allow for spatially controlled addition of polymer to foil include printing, photolithography, and lamination. Selective removal of polymer from an entirely polymer coated foil can be achieved by laser ablation. For continuous manufacture of such pouches an important process control issue is the alignment of the top and bottom patterned foil parts. One method whereby consistent alignment may be achieved is though the use of indexed stock material on reels.

According to a further alternate embodiment, full metal-to-metal sealed fluid-containing pouches 100 can be manufactured in which the interior fluid is entirely contained within polymer by first sealing a polymer pouch containing the fluid and then seal that container within a hermetic metal-to-metal sealed pouch. A polymer pouch can be produced by thermally sealing and severing a segment of polymer tubing filled with fluid. These polymer pouches can then be placed appropriately for sealing within a foil pouch.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description. All United States patents and applications, foreign patents, and publications discussed above are hereby incorporated herein by reference in their entireties.

What is claimed is:

1. A fluid-containing pouch, comprising:
    first and second opposing sheets having a substantially liquid and gas impermeable perimeter seal, wherein the impermeable perimeter seal has an undulating pattern, wherein the first sheet includes a first foil layer and a first plastic layer, and the second sheet includes a second foil layer and a second plastic layer;
    an interior plastic seal bead disposed at an interior edge of the substantially liquid and gas impermeable perimeter seal; and
    a fluid disposed between the first and second opposing sheets, wherein at least a portion of the substantially liquid and gas impermeable perimeter seal has a seal width less than about 4 mm, and wherein the pouch yields a Pouch Integrity Test $\Delta pCO_2$ value of less than about 10 mm Hg.

2. The fluid-containing pouch of claim 1, wherein the undulating pattern comprises a plurality of bends.

3. The fluid-containing pouch of claim 1, wherein the perimeter seal comprises a third plastic layer disposed between the first and second foils and having an average thickness less than the combined thickness of the first and second plastic layers.

4. The fluid-containing pouch of claim 3, wherein the third plastic layer has an average thickness that is at least about 25% less than the combined thickness of the first and second plastic layers.

5. The fluid-containing pouch of claim 3, wherein the third plastic layer has an average thickness that is at least about 50% less than the combined thickness of the first and second plastic layers.

6. The fluid-containing pouch of claim 3, wherein the first and second foil layers have a thickness in the range of from about 0.01 to about 2.0 mm.

7. The fluid-containing pouch of claim 3, wherein the first and second plastic layers have a thickness in the range of from about 0.005 to about 0.5 mm.

8. The fluid-containing pouch of claim 3, wherein the first and second plastic layers comprise plastic selected from the group consisting of Primacor, polyvinyl chloride, polyethylene and lacquer based on nitrocellulose, urea and acrylic resins.

9. The fluid-containing pouch of claim 3, wherein the first and second plastic layers are substantially rectangular and have respective areas in the range of from about 0.5 cm$^2$ to about 20 cm$^2$.

10. The fluid-containing pouch of claim 3, further comprising an exterior plastic bead along at least a portion of the perimeter seal.

11. The fluid-containing pouch of claim 3, wherein the perimeter seal is formed by applying heat in the range of from about 200° C. to about 500° C.

12. The fluid-containing pouch of claim 3, wherein the perimeter seal is formed by applying pressure in the range of from about 34.5 MN/m$^2$ to about 62.1 MN/m$^2$.

13. The fluid-containing pouch of claim 3, wherein the perimeter seal has a perimeter width of from about 1 mm to about 2 cm.

14. The fluid-containing pouch of claim 3, wherein the perimeter seal has a perimeter length of from about 1 cm to about 20 cm.

15. The fluid-containing pouch of claim 1, wherein the first sheet includes a first foil layer and a first lacquer layer, the second sheet includes a second foil layer and a second lacquer layer, and the first and second foil layers are fused to one another at the perimeter seal.

16. The fluid-containing pouch of claim 1, wherein the fluid is a calibrant fluid containing a known concentration of one or more analytes.

17. The fluid-containing pouch of claim 1, wherein the fluid is a reactant fluid.

18. The fluid-containing pouch of claim 1, wherein the fluid is a wash fluid.

19. The fluid-containing pouch of claim 1, wherein the pouch has a burst strength standard deviation of less than 12%.

20. The fluid-containing pouch of claim 1, wherein the first sheet and the second sheet, respectively, are opposing folded portions of a single plastic-lined foil.

21. The fluid-containing pouch of claim 1, wherein the first sheet and the second sheet, respectively, are two separate pieces of foil.

22. The fluid-containing pouch of claim 1, wherein the first sheet and the second sheet comprise a metallic foil selected from the group consisting of aluminum foil, copper foil and brass foil.

23. The fluid-containing pouch of claim 1, wherein the first sheet and the second sheet comprise foil with a thickness in the range of from about 0.01 to about 2.0 mm.

24. The fluid-containing pouch of claim 1, wherein the pouch has a pouch volume of from about 5 µL to about 5 mL.

25. The fluid-containing pouch of claim 24, wherein the pouch contains a liquid having a liquid volume of from about 5 µL to about 5 mL.

26. The fluid-containing pouch of claim 25, wherein the liquid volume is from about 50% to about 95%, based on the total pouch volume.

27. The fluid-containing pouch of claim 24, wherein the pouch contains a gas volume of about 5 μL to about 5 mL.

28. The fluid-containing pouch of claim 27, wherein the gas volume is from about 5% to about 50%, based on the total pouch volume.

29. The fluid-containing pouch of claim 27, wherein the gas in the gas phase comprises a calibrant gas having a known concentration or partial pressure of one or more gases.

30. The fluid-containing pouch of claim 27, wherein the gas in the gas phase is ambient air.

31. The fluid-containing pouch of claim 1, wherein the perimeter seal includes one or more crimped regions.

32. The fluid-containing pouch of claim 31, wherein the one or more crimped regions comprise multiple concentric crimping rings.

33. The fluid-containing pouch of claim 1, wherein the pouch is in a cartridge containing a sensor.

34. The fluid-containing pouch of claim 1, wherein the pouch contains a calibrant fluid used to calibrate a sensor.

35. The fluid-containing pouch of claim 1, wherein the pouch contains a calibrant fluid with a predetermined partial pressure of carbon dioxide, the calibrant fluid being used to calibrate a sensor for the partial pressure of carbon dioxide.

36. The fluid-containing pouch of claim 1, wherein the pouch is in a single-use cartridge containing at least one sensor, and wherein the cartridge is used in conjunction with a reader to measure an analyte is a sample.

37. A fluid-containing pouch, comprising:
   first and second opposing sheets having a substantially liquid and gas impermeable perimeter seal, wherein the impermeable perimeter seal has an undulating pattern, wherein the first sheet includes a first foil layer and a first plastic layer, and the second sheet includes a second foil layer and a second plastic layer;
   an exterior plastic seal bead and an interior plastic seal bead, wherein the interior plastic seal bead is disposed at an interior edge of the substantially liquid and gas impermeable perimeter seal; and
   a fluid disposed between the first and second opposing sheets, wherein the pouch has a burst strength with a standard deviation of less than 12%.

38. A method for forming a fluid-containing pouch, comprising the steps of:
   (a) depositing a fluid on a first sheet;
   (b) positioning a second sheet opposite the first sheet; and
   (c) sealing the opposing first and second sheets to one another and forming a sealed region having the fluid contained therebetween, wherein the sealed region is substantially liquid and gas impermeable;
   wherein the sealed region comprises a sealed perimeter region;
   wherein the first sheet and the second sheet are folded in an undulating pattern having a plurality of beads; and
   wherein the first sheet includes a first foil layer and a first plastic layer, and the second sheet includes a second foil layer and a second plastic layer, and wherein the step of sealing comprises melting the first plastic layer on the first sheet with the second plastic layer on the second sheet such that an interior plastic seal bead is formed, and wherein the interior plastic seal bead substantially prevents the calibrant liquid from contacting either of or both of the first and second foil layers.

39. The method of claim 38, wherein the pouch yields a Pouch Integrity Test $\Delta pCO_2$ value of less than 10 mm Hg.

40. The method of claim 38, wherein the sealing comprises applying heat and pressure to the first sheet and second sheets.

41. The method of claim 38, wherein the sealing comprises ultra-sonic welding.

42. The method of claim 38, wherein the sealing comprises laser welding.

43. The method of claim 38, wherein the perimeter seal comprises a third plastic layer disposed between the first and second foils and having an average thickness less than the combined thickness of the first and second plastic layers.

44. The method of claim 43, wherein the third plastic layer has an average thickness that is at least about 50% less than the combined thickness of the first and second plastic layers.

45. The method of claim 43, wherein the third plastic layer has an average thickness that is at least about 25% less than the combined thickness of the first and second plastic layers.

46. The method of claim 38, wherein the first plastic layer and the second plastic layer comprise lacquer, and wherein the step of sealing comprises ultrasonic welding the first foil layer to the second foil layer.

47. The method of claim 38, wherein the fluid is a calibrant fluid.

48. The method of claim 38, wherein the fluid is a reactant fluid.

49. The method of claim 38, wherein the fluid is a wash fluid.

50. The method of claim 38, wherein the pouch has a burst strength standard deviation of less than 12%.

51. The method of claim 38, further comprises forming a cavity in the first sheet, and depositing the fluid in the cavity.

52. A fluid-containing pouch formed by a method comprising the steps of:
   (a) depositing a fluid on a first sheet;
   (b) positioning a second sheet opposite the first sheet;
   (c) crimping the opposing first and second sheets to one another and forming a sealed region having the fluid contained there between, wherein the sealed region having an undulating pattern is substantially liquid and gas impermeable, wherein the first sheet includes a first foil layer and a first plastic layer, and the second sheet includes a second foil layer and a second plastic layer; and
   (d) melting the first plastic layer on the first sheet with the second plastic layer on the second sheet such that an interior plastic seal bead is formed.

53. A substantially gas-tight seal formed with plastic-lined foil, comprising:
   two portions of plastic-lined foil with plastic faces abutted where adjacent portions are sealed together to isolate a first phase from a second phase, where said seal is formed by applying sufficient heat and pressure to melt the plastic and form a plastic seal and a plastic seal bead, whereby the heat and pressure are applied by a crimping element yielding one or more regions of the seal with an undulating pattern where the average thickness of plastic in the crimped region is less than the initial combined thickness of the two plastic linings, and whereby gas transport between said first phase and said second phase through said plastic seal is substantially less than a seal where plastic is not crimped during sealing.

54. A substantially gas-tight plastic-lined foil pouch with a perimeter seal, comprising:
   two portions of plastic-lined foil with plastic faces abutted and sealed together to form an enclosure containing a liquid phase and a gas phase, where said perimeter seal is formed by applying sufficient heat and pressure to melt the plastic and form a plastic perimeter layer and an interior plastic seal bead, where the pressure is applied by a crimping element yielding one or more regions of the perimeter seal having an undulating pattern where the average thickness of plastic in the perimeter seal in the crimped regions is substantially less than the initial combined thickness of the two plastic linings.

55. A method of forming a substantially gas tight seal in a plastic-lined foil pouch, comprising:
 (a) forming a pocket in a first plastic-lined foil, applying a portion of liquid into the pocket;
 (b) covering the pocket with a second plastic-lined foil with the plastic faces abutted; and
 (c) sealing said first and second plastic-lined foils together to form a perimeter seal having an undulating pattern and to form an interior plastic seal bead, where said perimeter seal is formed by applying sufficient heat and pressure to melt the plastic and form a plastic perimeter layer, and where the pressure is applied by a crimping element yielding one or more regions of the perimeter seal where the average thickness of plastic in the crimped regions is substantially less than the combined thickness of the two plastic linings, said seal forming a substantially gas tight pouch containing a liquid phase and a gas phase.

56. The method of claim 55, performed with the foil on a reel.

57. The method of claim 55, wherein the pressure is applied with a jig that crimps the foil.

58. The method of claim 55, wherein the heat and pressure is applied with ultrasonic welding.

59. A method of forming a substantially gas-tight plastic-lined foil pouch with a perimeter seal, comprising:
 (a) a first step where two portions of plastic-lined foil with the plastic faces abutted are sealed together in an undulating pattern to form an enclosure with a perimeter seal containing a liquid phase and a gas phase, where said perimeter seal is formed by applying sufficient heat to melt the plastic and sufficient pressure to form a contiguous plastic perimeter seal and an interior plastic seal bead, and
 (b) a second step where said perimeter seal is crimped to yield one or more regions of the perimeter seal where the average thickness of plastic in the crimped regions is substantially less than the combined thickness of the two plastic linings.

60. A substantially gas-tight seal formed with plastic-lined foil, comprising: two portions of plastic-lined foil with the plastic faces abutted where adjacent portions are sealed together in an undulating pattern to isolate a first phase from a second phase, where said seal is formed by applying sufficient ultrasonic welding to melt the plastic and form a plastic seal and an interior plastic seal bead, whereby the ultrasonic weld yields one or more regions of the plastic seal where the average thickness of plastic in the seal region is substantially less than the initial combined thickness of the two plastic linings, and whereby gas transport between said first phase and said second phase through said plastic seal is substantially less than a seal where the thickness of plastic is substantially that of the combined thickness of two plastic linings.

61. A substantially gas-tight plastic-lined foil pouch with a perimeter seal, comprising:
 two portions of plastic-lined foil with the plastic faces abutted and sealed together to form an interior plastic seal bead and an undulating pattern containing a liquid phase and a gas phase, where said perimeter seal is formed by applying an ultrasonic weld to melt the plastic and form a contiguous plastic perimeter layer, and force a portion of plastic from the seal region into at least a portion of the perimeter of the enclosure, whereby the average thickness of plastic in the perimeter seal is less than the initial combined thickness of the two plastic linings.

62. A method of forming a substantially gas tight seal in a plastic-lined foil pouch comprising:
 (a) forming a pocket in a first plastic-lined foil;
 (b) applying a portion of liquid into the pocket;
 (c) covering the pocket with a second plastic-lined foil with the plastic faces abutted; and
 (d) sealing said first and second plastic-lined foils together to form a perimeter seal having an undulating pattern and to form an interior plastic seal bead, where said perimeter seal is formed by applying an ultrasonic weld to melt the plastic and force a portion of plastic from the seal region into the pocket, said seal forming a substantially gas tight pocket containing a liquid phase and a gas phase, whereby the average thickness of plastic in the perimeter seal is substantially less than the combined thickness of the two plastic linings.

63. A substantially gas-tight seal formed with plastic-lined foil, comprising: two portions of plastic-lined foil with the plastic faces abutted where adjacent portions are sealed together to form an interior plastic seal bead and an undulating pattern to isolate a first phase from a second phase, where said seal is formed by applying sufficient welding energy to substantially remove plastic from the seal region and melt the foil and form a metal-to-metal seal in said seal region.

64. The seal of claim 63, wherein said welding energy is provided by ultrasonic energy or laser energy.

* * * * *